US012314510B2

(12) United States Patent
Min et al.

(10) Patent No.: US 12,314,510 B2
(45) Date of Patent: May 27, 2025

(54) SEMICONDUCTOR DEVICE

(71) Applicant: SAMSUNG ELECTRONICS CO., LTD., Suwon-si (KR)

(72) Inventors: Kyungjik Min, Suwon-si (KR);
Minsung Kim, Suwon-si (KR);
Junesoo Kim, Suwon-si (KR);
Sung-Jin Park, Suwon-si (KR);
Seung-Hoon Baek, Suwon-si (KR);
Kyeonggon Lee, Suwon-si (KR);
Choonghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/115,926

(22) Filed: Mar. 1, 2023

(65) Prior Publication Data
US 2024/0069668 A1 Feb. 29, 2024

(30) Foreign Application Priority Data

Aug. 24, 2022 (KR) ........................ 10-2022-0106201

(51) Int. Cl.
*G06F 3/044* (2006.01)
*G06F 3/041* (2006.01)

(52) U.S. Cl.
CPC ........ *G06F 3/04166* (2019.05); *G06F 3/0412* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 8,169,415 B2 | 5/2012 | Shin et al. | |
| 8,760,412 B2 | 6/2014 | Hotelling et al. | |
| 11,244,632 B2 | 2/2022 | Eom et al. | |
| 2019/0384444 A1* | 12/2019 | Wingard | G06F 3/0416 |
| 2020/0097112 A1* | 3/2020 | Seo | G06F 3/044 |
| 2020/0210009 A1* | 7/2020 | Kim | G06F 3/0443 |
| 2020/0233526 A1* | 7/2020 | Kim | G06F 3/0418 |
| 2020/0326805 A1* | 10/2020 | Lee | G06F 3/0412 |
| 2021/0200354 A1* | 7/2021 | Kang | G06F 3/0416 |
| 2021/0333974 A1 | 10/2021 | Chen et al. | |
| 2022/0121302 A1 | 4/2022 | Tsai | |
| 2022/0214791 A1* | 7/2022 | Cho | G09G 3/3225 |

FOREIGN PATENT DOCUMENTS

| | | |
|---|---|---|
| KR | 10-2171623 B1 | 10/2020 |
| KR | 10-2316453 B1 | 10/2021 |

* cited by examiner

*Primary Examiner* — Temesghen Ghebretinsae
*Assistant Examiner* — Sosina Abebe
(74) *Attorney, Agent, or Firm* — Sughrue Mion, PLLC

(57) ABSTRACT

A semiconductor device is disclosed. The semiconductor device includes a transceiver including an amplifier region configured to output a data signal to a source line connected to a pixel during a first period and receive a detection signal from a touch electrode during a second period different from the first period, and configured to generate the data signal based on input data; and a driving controller configured to generate the data based on input image data, outputting the data to the transceiver, and generate a touch signal based on the detection signal.

23 Claims, 17 Drawing Sheets

SEMICONDUCTOR DEVICE

CROSS-REFERENCE TO RELATED APPLICATION

This application is based on and claims priority to Korean Patent Application No. 10-2022-0106201 filed in the Korean Intellectual Property Office on Aug. 24, 2022, the entire contents of which are incorporated herein by reference.

BACKGROUND

1. Field

The disclosure relates to a semiconductor device.

2. Description of Related Art

In general, a display panel provides various visual information to a user by displaying an image. The display panel includes a plurality of pixels, and each of the plurality of pixels expresses light at a predetermined luminance to display an image. The display panel may include a Display Driver Integrated Circuit (DDI) which is used to drive the pixels.

Recently, various electronic devices are equipped with a display panel capable of sensing a touch. The display panel capable of sensing a touch may separately include a touch panel provided with a touch element for sensing a touch, or may include a touch element in the display panel. The touch driver IC is used to apply a driving signal to the touch element and sense a change in the signal from the touch element due to a touch.

SUMMARY

An example embodiment of the disclosure may provide a semiconductor device in which a display driver IC and a touch driver IC are integrated into one IC.

An example embodiment of the disclosure may provide a semiconductor device capable of time-divisionally driving a pixel and a touch element.

According to an aspect of the disclosure, there is provided an electronic device, including: a transceiver including a first amplifier region configured to: output a first data signal based on first data, to a first source line connected to a pixel during a first period, and receive a detection signal from a touch electrode during a second period different from the first period; and a controller configured to: generate the first data based on second data, which is image data, output the first data to the transceiver, and generate a touch signal based on the detection signal.

The first amplifier region may be further configured to: amplify an input signal a first node, the input signal generated based on the first data, output the amplified input signal to the first source line as the first data signal through a second node during the first period, and output the detection signal input from the touch electrode to the second node through a third node during the second period.

The transceiver may further include: a digital-to-analog converter (DAC) configured to generate the input signal based on the first data; and an analog-to-digital converter (ADC) configured to generate the touch signal based on the detection signal.

The first amplifier region may include: a first amplifier including a first input terminal connected to a fourth node and a first output terminal connected to the second node; a first switch connected between the fourth node and a fifth node; a capacitor including a first electrode connected to the second node and a second electrode connected to the fifth node; a second amplifier includes a second input terminal connected to the first node, a third input terminal connected to the third node, and a second output terminal connected to the fourth node; a second switch connected between the fifth node and the third node; a third switch connected between the second node and the third node; a fourth switch connected between a sixth node and the third node; a fifth switch connected between the sixth node and the second node; a sixth switch connected between the first node and a common voltage supply terminal; a seventh switch connected between the first node and the DAC, and an eighth switch connected between the second node and the ADC.

The controller may be further configured to control the transceiver during the first period to turn on the first switch, the third switch, the fifth switch, and the seventh switch and turn off the second switch, the fourth switch, the sixth switch, and the eighth switch during the first period.

The controller may be further configured to control the transceiver during the second period to turn on the second switch, the fourth switch, the sixth switch, and the eighth switch, and turn off the first switch, the third switch, the fifth switch, and the seventh switch.

The transceiver may further include a multiplexer configured to electrically connect the first source line and the second node or electrically connect the touch electrode and the third node based on a voltage level of an input selection signal.

The multiplexer may be further configured to electrically connect the first source line and the second node during the first period, and electrically connect the touch electrode and the third node during the second period.

The transceiver may further include a second amplifier region configured to: output a second data signal to a second source line connected to a second pixel during the first period, and receive the detection signal from the touch electrode during the second period.

The transceiver may further include: a first multiplexer configured to electrically connect the first source line and the first amplifier region or electrically connect the touch electrode and the first amplifier region based on a voltage level of an input selection signal; and a second multiplexer configured to electrically connect the second source line and the second amplifier region or electrically connect the touch electrode and the second amplifier region based on the voltage level of the input selection signal.

According to another aspect of the disclosure, there is provided an electronic device including: a panel including: a pixel connected to a gate line and a source line, a first touch electrode extending in a first direction, and a second touch electrode extending in a second direction intersecting the first direction; and a driving circuit including an amplifier region configured to: transmit a data signal to the panel during a first period, and receive a detection signal from the panel during a second period different from the first period.

The panel may include: a first panel on which the gate line, the source line, and the pixel are provided, and a second panel positioned on the first panel and on which the first touch electrode and the second touch electrode are provided.

The driving circuit may further include a multiplexer configured to electrically connect the source line and the amplifier region or electrically connect the first touch electrode and the amplifier region based on a voltage level of an input selection signal.

The panel may further include a shift register configured to output a gate signal to the gate line and a driving signal to the second touch electrode.

The gate line, the source line, the pixel, and the second touch electrode may be provided on the panel, and the second touch electrode may include the gate line.

The panel may further include a multiplexer configured to electrically connect the source line and the amplifier region or electrically connect the first touch electrode and the amplifier region based on a voltage level of an input selection signal.

The gate line, the source line, and the pixel may be provided on the panel, the first touch electrode may include the source line, and the second touch electrode may include the gate line.

The pixel may be configured to display an image in units of one frame, and the second period may be a time period within a vertical blank period of one frame.

The pixel may be configured to display an image in units of one frame, and the one frame may include a plurality of horizontal periods, and each of the plurality of horizontal periods may include the first period and the second period.

According to another aspect of the disclosure, there is provided an electronic system including: a host configured to provide an image signal; a touch-display panel including a plurality of pixels and a plurality of first touch electrodes, and a driving circuit configured to: receive the image signal from the host, generate a plurality of data signals corresponding to the plurality of pixels based on the image signal, receive a detection signal from the plurality of first touch electrodes to generate a touch signal, and provide the touch signal to the host, wherein the driving circuit may include a plurality of amplifier regions configured to: provide the plurality of data signals to the plurality of pixels during a first period, and receive detection signals from the plurality of first touch electrodes during a second period different from the first period to generate an output signal.

According to another aspect of the disclosure, there is provided an electronic device, including: an amplifier; a first switch element provided between an output terminal of the amplifier and a touch-display panel; and a second switch element provided between an input terminal of the amplifier and the touch-display panel, wherein the amplifier is configured to: output a first data signal, through the first switch element, to a first source line connected to a pixel in the touch-display panel during a first period, and receive a detection signal from a touch electrode in the touch-display panel, through the second switch element, during a second period different from the first period.

DETAILED DESCRIPTION

Figure 1:
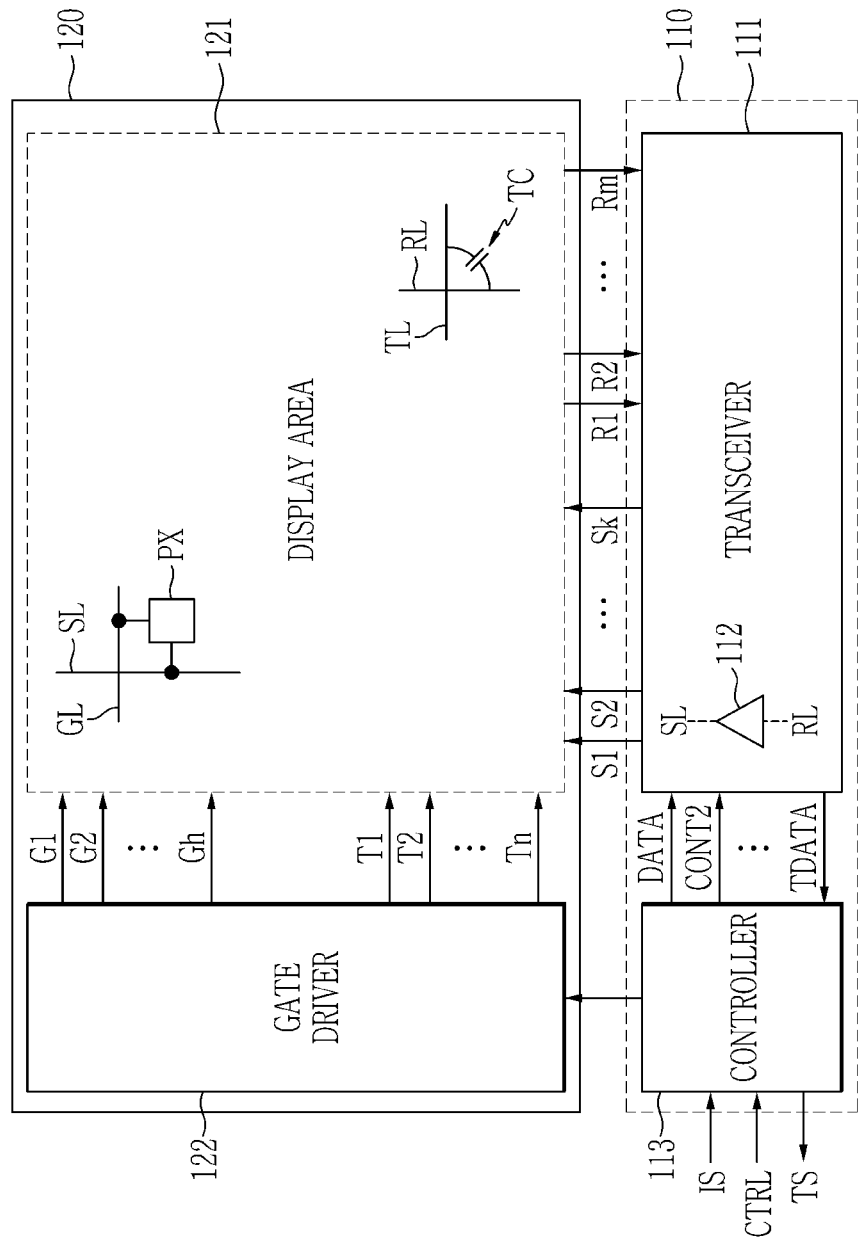
FIG. 1 is a block diagram schematically illustrating a touch-enabled display device according to an example embodiment.

In the following detailed description, only certain example embodiments of the disclosure have been illustrated and described, simply by way of illustration. As those skilled in the art would realize, the described example embodiments may be modified in various different ways, all without departing from the spirit or scope of the invention.

Accordingly, the drawings and description are to be regarded as illustrative in nature and not restrictive. Like reference numerals designate like elements throughout the specification. In the flowchart described with reference to the drawing, the order of operations may be changed, several operations may be merged, some operations may be divided, and specific operations may not be performed.

In addition, expressions written in the singular may be construed in the singular or plural unless an explicit expression such as "a" or "single" is used. Terms including an ordinary number, such as first and second, are used for describing various constituent elements, but the constituent elements are not limited by the terms. These terms may be used for the purpose of distinguishing one component from another.

FIG. 1 is a block diagram schematically illustrating a touch-enabled display device 100 according to an example embodiment.

According to an example embodiment, the display device 100 may include a driving circuit 110 and a panel 120. In some example embodiments, the display device 100 may further include a power supply circuit, such as a DC/DC converter, providing a driving voltage to the driving circuit 110 and the panel 120.

The panel 120 may include a display area 121 in which an image is displayed and a gate driver 122 configured to output a driving signal to the display area 121. In some example embodiments, the gate driver 122 may be included in the driving circuit 110.

A plurality of pixels PX for displaying an image may be positioned in the display area 121. The pixel PX may be connected to a corresponding source line SL among the plurality of source lines and a corresponding gate line GL among the plurality of gate lines. The pixel PX may receive a data signal from the source line SL when a gate signal is supplied to the gate line GL. The pixel PX may express light of a specific luminance corresponding to the input data signal. For example, The pixel PX may output light of a predetermined luminance value corresponding to the input data signal. The plurality of pixels PX may display an image in units of one frame.

According to an example embodiment, when the display device 100 is an organic light emitting display device, each of the pixels PX may include a plurality of transistors including a driving transistor and an organic light emitting diode. The driving transistor may supply a current corresponding to the data signal to the organic light emitting diode, so that the organic light emitting diode may emit light with a predetermined luminance. When the display device 100 is a liquid crystal display device, each of the pixels PX may include a switching transistor and a liquid crystal capacitor. The pixel PX may control the transmittance of the liquid crystal based on the data signal, so that it is possible to control light of a predetermined luminance to be supplied to the outside. For example, the pixel PX may control the transmittance of the liquid crystal in response to the data signal, so that it is possible to control light of a predetermined luminance to be supplied to the outside.

Although the pixel PX is illustrated as being connected to one source line SL and one gate line GL in FIG. 1, the connection structure of the signal line of the pixel PX of the display device according to the example embodiment is not limited thereto. For example, various signal lines may be additionally connected to correspond to the circuit structure of the pixel PX. In the example embodiment, the pixel PX may be implemented in various currently known forms.

A plurality of touch elements may be positioned in at least a portion of the display area 121. For example, the display device 100 may operate in a mutual capacitance method. In this case, a first touch electrode RL and a second touch electrode TL for sensing a touch input may be positioned in at least a partial area of the display area 121. The first touch electrode RL and the second touch electrode TL may extend in directions crossing each other. The first touch electrode RL and the second touch electrode TL may be arranged in directions crossing each other. According to an example embodiment, the first touch electrode RL and the second touch electrode TL may intersect each other. According to another example embodiment, the first touch electrode RL may extend in a first direction and the second touch electrode TL may extend in a second direction perpendicular to the first direction. The first touch electrode RL and the second touch electrode TL may form a touch capacitance TC. A driving signal may be applied to the second touch electrode TL. A driving signal applied to the second touch electrode TL through the touch capacitance TC may be transmitted to the first touch electrode RL. When there is a touch input, the touch input may be sensed by a change in the potential of the first touch electrode RL. As another example, the display device 100 may operate in a self-capacitance method. In this case, a plurality of touch electrodes may be arranged in a matrix form in at least a portion of the display area 121. A driving signal may be applied to each of the plurality of touch electrodes. When there is a touch input, the touch input may be sensed by a change in potential of each of the plurality of touch electrodes to which the driving signal is applied.

In the above description, it has been described that the plurality of source lines SL and the plurality of first touch electrodes RL are separate elements. However, the disclosure is not limited thereto, and as such, according to another example embodiment, some of the plurality of source lines SL may operate as the first touch electrodes RL, which will be described later with reference to FIG. 14.

The gate driver 122 may provide a plurality of gate signals G1, G2, . . . , Gh. The plurality of gate signals G1, G2, . . . , Gh may be pulse signals having an enable level and a disable level. The plurality of gate signals G1, G2, . . . , Gh may be applied to the plurality of gate lines GL. When the gate signal of the enable level is applied to the gate line GL connected to the pixel PX, the data signal applied to the source line SL connected to the pixel PX may be transmitted to the pixel PX. The gate driver 122 may provide a plurality of gate signals G1, G2, . . . , Gh for a plurality of horizontal periods. One frame may include a plurality of horizontal periods.

The gate driver 122 may provide a plurality of driving signals T1, T2, . . . , Tn. The plurality of driving signals T1, T2, . . . , Tn may be pulse signals having an enable level and a disable level. According to an example embodiment, the levels are voltage levels. The plurality of gate driving signals T1, T2, . . . , Tn may be applied to the plurality of second touch electrodes TL.

According to an example embodiment illustrated in FIG. 1, the gate driver 122 is implemented on the same substrate as the panel 120 and is positioned at the periphery of the panel 120. However, the disclosure is not limited thereto, and as such, according to another example embodiment, the gate driver 122 may be implemented as a separate semiconductor die, chip, or module and connected to the panel 120. In addition, a portion of the gate driver 122 may be positioned in the panel 120 and the remaining portion may be included in the driving circuit 110.

According to an example embodiment, the panel 120 may include a first panel on which the source line SL, the gate line GL, and the pixel PX are positioned and a second panel in which the first touch electrode RL and the second touch electrode TL are positioned. This will be described later with reference to FIG. 5.

In the example embodiment, the panel 120 may be one panel in which the source line SL, the gate line GL, the pixel PX, the first touch electrode RL, and the second touch electrode TL are positioned. This will be described later with reference to FIGS. 11, 12, and 14.

The driving circuit 110 may include a transceiver 111 and a controller 113. According to an example embodiment, the controller 113 may be a driving controller. Some or all of the transceiver 111 and the controller 113 may be implemented as the same semiconductor die, chip, or module, or may be implemented as separate semiconductor dies, chips, or modules, respectively. In some example embodiments, the transceiver 111 may be implemented on the same substrate as the panel 120. In this case, the transceiver 111 may be disposed on the periphery of the panel 120.

The transceiver 111 may receive data DATA from the controller 113 and transmit data signals based on the received data DATA to the panel 120. According to an example embodiment, the transceiver 111 may receive the data DATA from the controller 113 in the form of a digital signal and convert the data DATA into the data signals S1, S2, . . . , Sk, which are in the form of an analog signal. Here, the data DATA may include grayscale information corresponding to each pixel PX for displaying image data IS on the panel 120. The transceiver 111 may transmit a plurality of data signals S1, S2, . . . , Sk to the panel 120 according to a source driver control signal CONT2 provided from the controller 113. The transceiver 111 may operate as a source driver or a data driver. In the example embodiment, the transceiver 111 may receive detection signals R1, R2, . . . , Rm from the plurality of first touch electrodes RL. The transceiver 111 may sense a change in potential of the plurality of first touch electrodes RL. The transceiver 111 may amplify detection signals R1, R2, . . . , Rm. The transceiver 111 may convert the amplified detection signals R1, R2, . . . , Rm into a touch data signal TDATAi in the form of a digital signal. The transceiver 111 may output the touch data signal TDATAi to the controller 113

The transceiver 111 may operate as a receiver.

According to an example embodiment, the transceiver 111 may operate as a source driver or a receiver by time division. That is, the transceiver 111 may operate as a source driver within a first time period and may operate as a receiver within a second time period other than the first time period. For example, the transceiver 111 may operate as a receiver during some periods of a vertical blank period VBLANK within one frame and may operate as a source driver during a period other than some periods within one frame. The transceiver 111 may operate as a receiver in some periods of the horizontal blank period HBLANK within one horizontal period and operate as a source driver during a period other than some periods in one horizontal period. The transceiver 111 may operate as a source driver in some periods of an active section within one horizontal period and operate as a receiver in a period other than some periods during one horizontal period.

When the transceiver 111 operates as the source driver, the transceiver 111 may be electrically connected to the plurality of source lines SL. The transceiver 111 may transmit a plurality of data signals S1, S2, . . . , Sk to the plurality of electrically connected source lines SL. When the transceiver 111 operates as a receiver, the transceiver 111 may be electrically connected to the plurality of first touch electrodes RL. The transceiver 111 may receive the plurality of detection signals R1, R2, . . . , Rm from the plurality of electrically connected first touch electrodes RL. That is, the transceiver 111 may be electrically connected to the plurality of source lines SL or the plurality of first touch electrodes RL by dividing time.

The transceiver 111 may include an amplifier region 112. When the transceiver 111 operates as a source driver, an output terminal of the amplifier region 112 may be electrically connected to the source line SL. The amplifier region 112 may transmit a corresponding data signal among the plurality of data signals S1, S2, . . . , Sk to the source line SL. When the transceiver 111 operates as a receiver, an input terminal of the amplifier region 112 may be electrically connected to the first touch electrode RL. The amplifier region 112 may receive a corresponding detection signal from among the plurality of detection signals R1, R2, . . . , Rm from the first touch electrode RL.

The controller 113 may receive the image data IS and a driving control signal CTRL from the host device and control the gate driver 122 and the transceiver 111. Here, the host device may be a computing device or system that controls the display device 100 to display an image desired by a user on the panel 120 from the outside. The driving control signal CTRL provided from the host device may include a control command for controlling the gate driver 122 and the transceiver 111, setting data, and the like. The controller 113 may control the gate driver 122 and the transceiver 111 based on the driving control signal CTRL. For example, the driving control signal CTRL may include a horizontal synchronization signal HSYNC, a vertical synchronization signal VSYNC, a main clock signal MCLK, and a data enable signal DE. The controller 113 may generate data DATA by dividing the image data IS in units of one frame based on the vertical synchronization signal VSYNC, and dividing the image data IS in units of the gate lines GL based on the horizontal synchronization signal HSYNC. The controller 113 may perform, for example, a control of synchronizing the operations of the transceiver 111 and the gate driver 122 by transmitting the gate driver control signal CONT1 and the transceiver control signal CONT2 to the gate driver 122 and the transceiver 111, respectively. The controller 113 may control the transceiver 111 and the gate driver 122 so that the gate driver 122 outputs a plurality of driving signals T1, T2, . . . , Tn when the transceiver 111 operates as a receiver. The controller 113 may also control the gate driver 122 and the transceiver 111 separately from the driving control signal CTRL received from the host device or based on a control command generated by itself in addition to the driving control signal CTRL.

In the example embodiment, the controller 113 may perform digital signal processing DSP on the touch data signal TDATAi. That is, the controller 113 may generate information about the input touch by using the touch data signal TDATAi. Specifically, the controller 113 may determine whether a touch is input, the number of touch inputs, the location of the touch input, and the like, by using the touch data signal TDATAi. For example, the controller 113 may determine the touch location by using the touch data signal TDATAireceived at the timing of applying each of the plurality of driving signals T1, T2, . . . , Tn. The controller 113 may generate information about the input touch as a touch signal TS and transmit the generated touch signal TS to the host device. The touch signal TS may include, for example, a touch count field and a touch entity field. A value indicating the number of times of the touch input during a particular time period may be written in the touch count field. The particular time period may be a predetermined time period. The touch entity field may include a field indicating information about each touch input. For example, the touch entity field may include a flag field, an X-axis coordinate field, a Y-axis coordinate field, a Z value field, an area field, and a touch action field. The number of touch entity fields may be equal to the value of the number of times of the touch input written in the touch count field. A value indicating a touch object may be written in the flag field. For example, a finger, a palm, and a stylus pen may be written into the flag field with different values. Values representing the calculated touch coordinates may be written in the X-axis coordinate field and the Y-axis coordinate field. A value corresponding to the signal strength of the detection signal may be written in the Z value field. A value corresponding to the area of the touched area may be written in the area field.

According to an example embodiment, the transceiver 111 may operate as a source driver or a receiver based on time division. The transceiver 111 according to the example embodiment may transmit a data signal to the source line SL or receive a detection signal from the first touch electrode RL by using one amplifier region 112. Accordingly, example the area occupied by the transceiver 111 is reduced, so that the size of the driving circuit 110 may be reduced.

Figure 2:
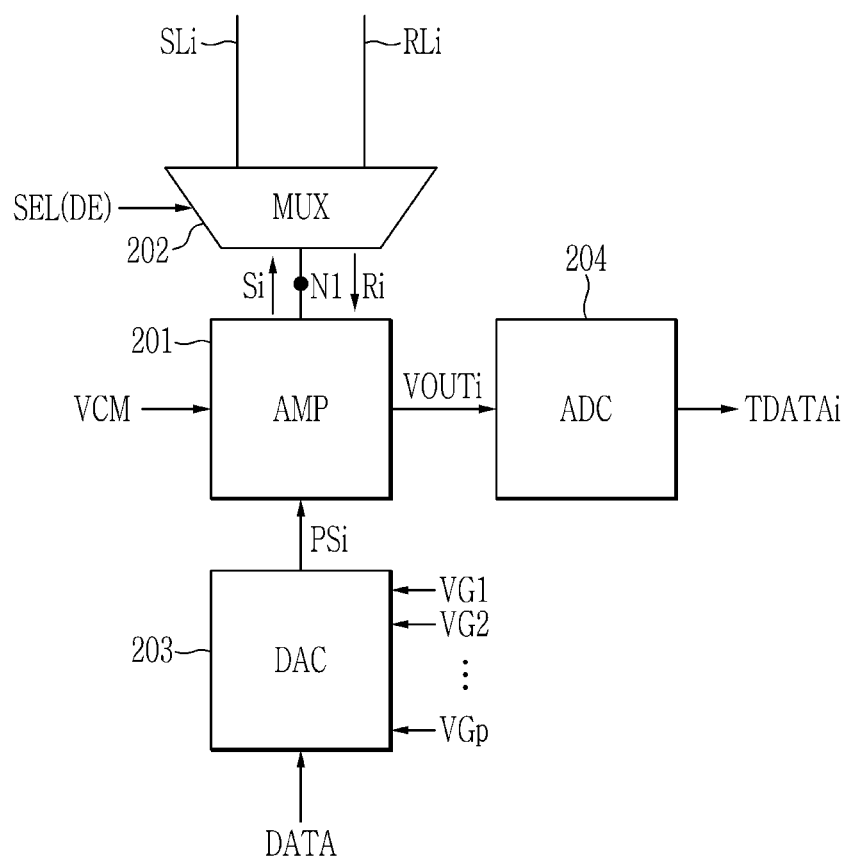
FIG. 2 is a block diagram illustrating a semiconductor device according to an example embodiment.

FIG. 2 is a block diagram illustrating a semiconductor device according to the example embodiment.

Referring to FIG. 2, the semiconductor device 200 may include an amplifier region 201, a multiplexer 202, a digital to analog converter (DAC) 203, and an analog to digital converter (ADC) 204. The semiconductor device 200 may be the driving circuit 110 or the transceiver 111 of FIG. 1. According to an example embodiment illustrated in FIG. 2, the multiplexer 202 is included in the semiconductor device 200. However, the disclosure is not limited thereto, and as such, according to another example embodiment, the multiplexer 202 may also be implemented on the same substrate as the panel 120 of FIG. 1.

According to an example embodiment, the amplifier region 201 may be connected to the multiplexer 202, the DAC 203, and the ADC 204. According to an example embodiment, the amplifier region 201 may operate as a receiver or a source driver. When the amplifier region 201 operates as a receiver, the amplifier region 201 may receive a detection signal from the first touch electrode RLi. The amplifier region 201 may output an amplified output signal VOUTi to the ADC 204 by comparing the detection signal with a common voltage VCM. When the amplifier region 201 operates as a source driver, the amplifier region 201 may receive the input signal PSi from the DAC 203. The amplifier region 201 may amplify the input signal PSi received from the DAC 203 to generate a data signal Si, and the generated data signal Si may be transmitted to the panel 120 in FIG. 1 through the source line Si.

The multiplexer 202 and the amplifier region 201 may be connected at a first node N1. The multiplexer 202 may electrically connect the source line SLi and the amplifier region 201 or electrically connect the first touch electrode RLi and the amplifier region 201 according to the level of the selection signal SEL (or the data enable signal DE). For example, the multiplexer 202 may electrically connect the source line SLi to the first node N1 when the selection signal SEL (or the data enable signal DE) has a logic level "H", and may electrically connect the first touch electrode RLi to the first node N1 when the selection signal SEL (or the data enable signal DE) has a logic level "L".

The DAC 203 may receive the data DATA and convert the data DATA from a digital signal to an analog signal. For example, the DAC 203 may convert the data DATA in the form of a digital signal into an analog signal by matching the plurality of gamma voltages VG1 to VGp received from a gamma voltage generator with the data DATA. The converted analog signal is transmitted to the amplifier region 201 to become an input signal PSi for the amplifier provided in the source amplifier region 201.

The ADC 204 may receive the output signal VOUTi and convert the output signal VOUTi from an analog signal to a digital signal. The amplifier region 201 and the ADC 204 may operate as an analog front end (AFE). The analog front end may further include a capacitor, a switch, a resistor, and a sampling and holder in addition to the amplifier region 201 and the ADC 204. However, the disclosure is not limited to the implementation form of the analog front end. For example, a voltage corresponding to the charge charged in the capacitor of the amplifier region 201 may be sampled by the sampling and holder and then held for a certain period, and the ADC 204 may convert the sampled signal into touch data TDATAi in the form of a digital signal and output the converted signal.

Hereinafter, a method of operating the semiconductor device 200 will be described with reference to FIGS. 3 and 4 together.

Figure 3:
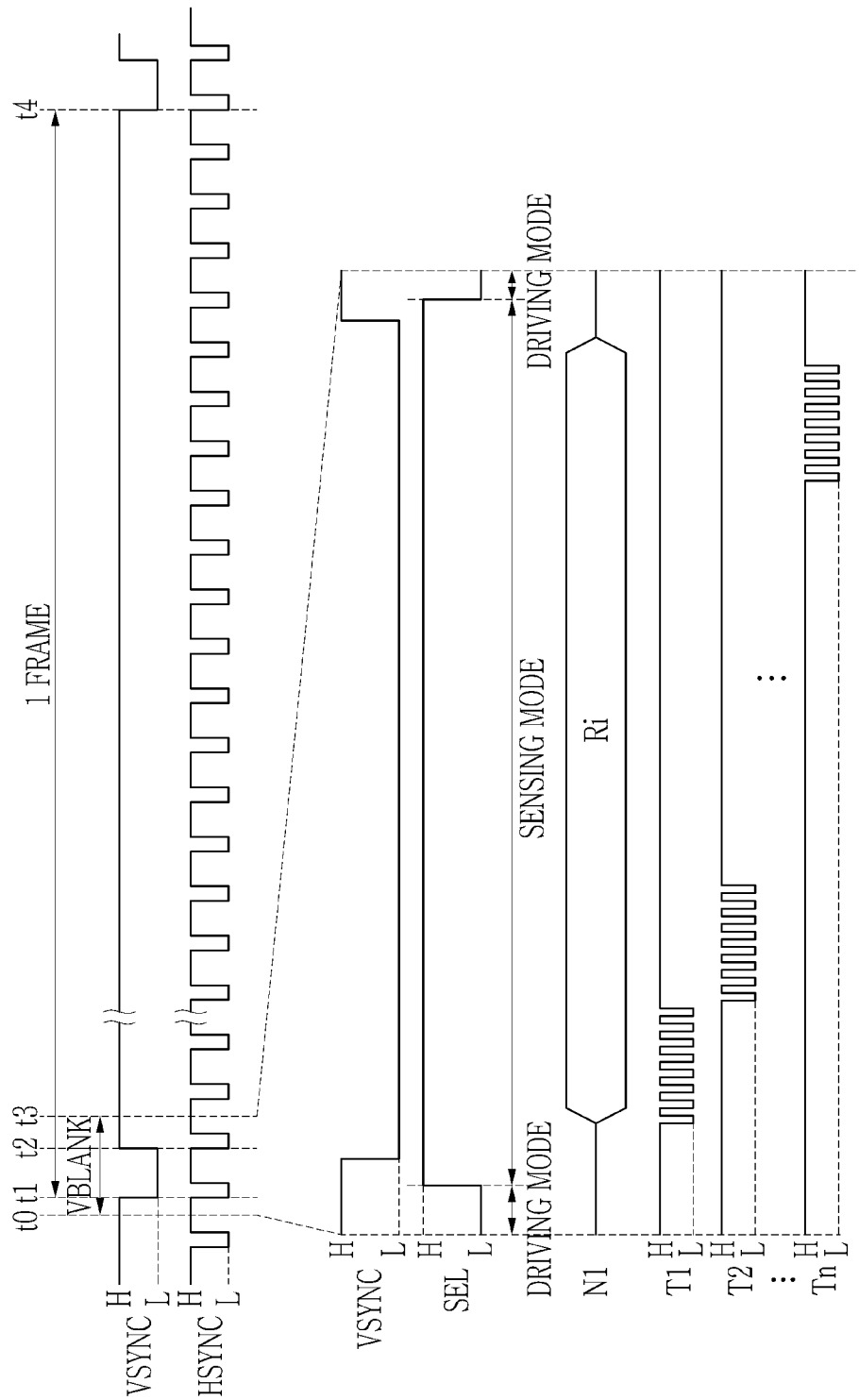
FIG. 3 is a timing diagram illustrating a method of operating a display device according to an example embodiment.

FIG. 3 is a timing diagram illustrating a method of operating a display device according to an example embodiment.

A period t1 to t4 of the pulse of the vertical synchronization signal VSYNC may be one frame period (1 FRAME) according to a display frame rate.

The vertical blank period VBLANK may include a period t1 to t2 in which the vertical synchronization signal VSYNC is an enable level ("L") and a period around the period t1 to t2. For example, the vertical blank period VBLANK may include a period t1 to t2 in which the vertical synchronization signal VSYNC is an enable level ("L") and a period adjacent the period t1 to t2. The vertical blank period VBLANK may include a period t0 to t1 before the vertical synchronization signal VSYNC transits from the disable level ("H") to the enable level ("L"), a period t1 to t2 during which the vertical synchronization signal VSYNC is the enable level ("L"), and a period t2 to t3 after the vertical synchronization signal VSYNC transits from the enable level ("L") to the disable level ("H").

Within the vertical blank period VBLANK, the selection signal SEL may transit from the logic level "L" to the logic level "H". When the selection signal SEL is at the logic level "H", the gate driver (e.g., the gate driver 122 in FIG. 1) and the transceiver (e.g., the transceiver 111 in FIG. 1) may operate in a sensing mode. Specifically, in the sensing mode, the gate driver 122 may provide the plurality of driving signals T1, T2, . . . , Tn to the plurality of second touch electrodes TL. The plurality of driving signals T1, T2, . . . , Tn may be signals having a voltage pulse shape of a specific frequency. According to an example embodiment, the specific frequency may be a predetermined frequency. The gate driver 122 may sequentially provide the plurality of driving signals T1, T2, . . . , Tn to the plurality of second touch electrodes TL. In the sensing mode, the multiplexer 202 may electrically connect the first touch electrode RLi to the first node N1. The detection signal Ri from the first touch electrode RLi may be transmitted to the amplifier region 201 through the first node N1.

When the selection signal SEL is at the logic level "L", the gate driver 122 and the transceiver 111 may operate in a driving mode. That is, during a period excluding a partial section of the vertical blank period VBLANK and the vertical blank period VBLANK of one frame period (1 frame), the gate driver 122 and the transceiver 111 may operate in the driving mode. In the driving mode, the transceiver 111 may be synchronized with the horizontal synchronization signal HSYNC to apply data signals to the plurality of source lines SL. For example, whenever every pulse of the horizontal synchronization signal Hsync is applied, the transceiver 111 may apply a data signal corresponding to the pixel PX connected to the gate line GL to which the gate signal is applied to the source line SL.

Figure 4:
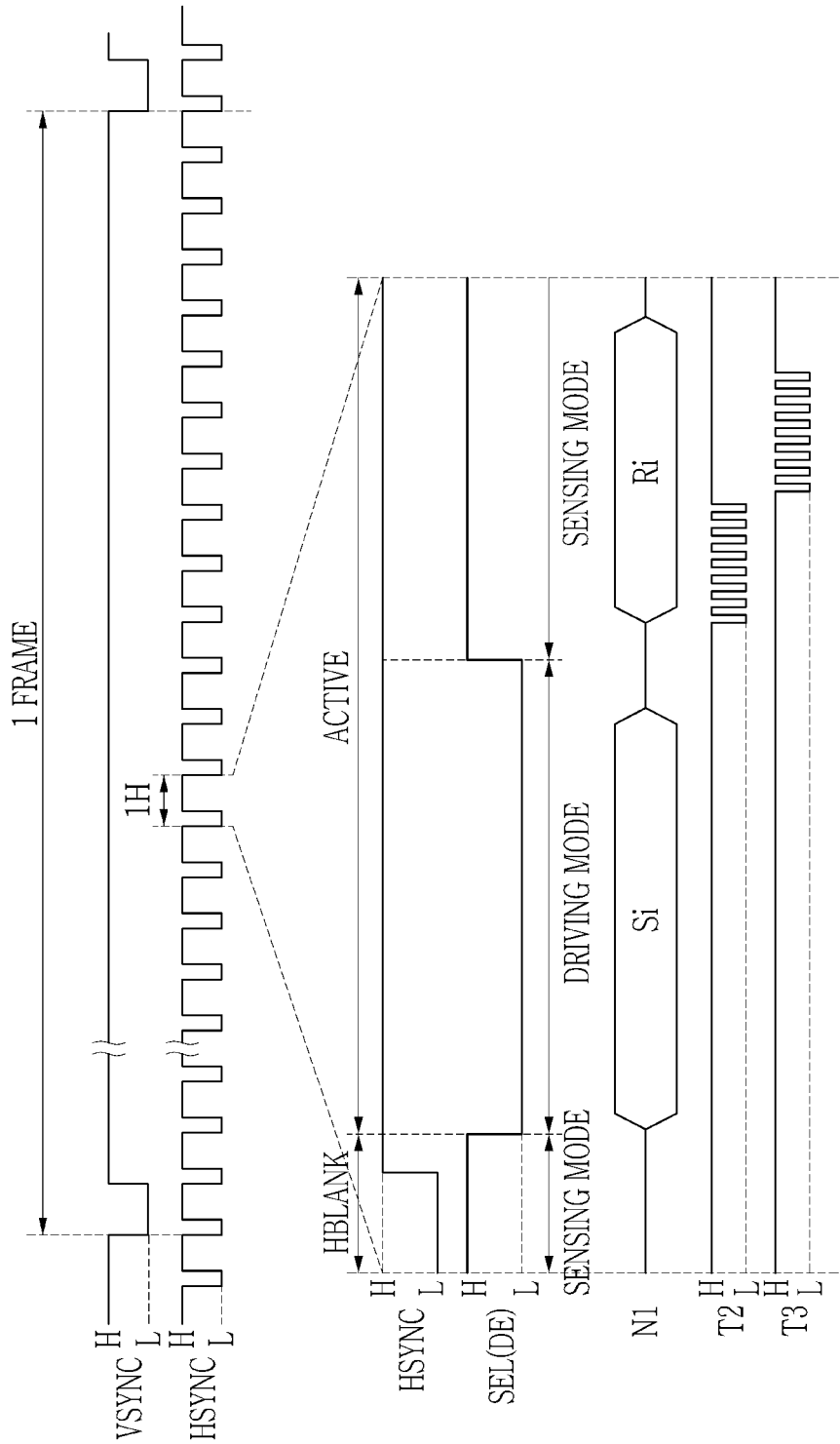
FIG. 4 is a timing diagram illustrating a method of operating a display device according to an example embodiment.

FIG. 4 is a timing diagram illustrating the method of operating the display device according to an example embodiment.

Referring to FIG. 4, the plurality of horizontal periods 1H may include a horizontal blank period HBLANK and an active period ACTIVE.

The horizontal blank period HBLANK may include a period in which the horizontal synchronization signal HSYNC is at the enable level "L" and a period around the period in which the horizontal synchronization signal HSYNC is at the enable level "L". The active period ACTIVE may be a period other than the horizontal blank period HBLANK within one horizontal period 1H.

In the active period ACTIVE, the selection signal SEL (or the data enable signal DE) may transit from the logic level "H" to the logic level "L". When the selection signal SEL is at the logic level "L", the gate driver 122 and the transceiver 111 may operate in the driving mode. In the driving mode, the transceiver 111 may be synchronized with the horizontal synchronization signal HSYNC to apply the data signal S1 to the plurality of source lines SL. For example, the transceiver 111 may be synchronized with the horizontal synchronization signal Hsync and apply the data signal Si corresponding to the pixel PX connected to the gate line GL to which the gate signal is applied to the source line SL.

The selection signal SEL may transit from the logic level "L" to the logic level "H". When the selection signal SEL is at the logic level "H", the gate driver 122 and the transceiver 111 may operate in the sensing mode. Specifically, in the sensing mode, the gate driver 122 may provide at least one driving signal T2 and T3 to the at least one second touch electrode TL. At least one driving signal T2 and T3 may be a signal having a voltage pulse shape of a predetermined frequency. The gate driver 122 may sequentially provide at least one driving signal T2 and T3 to the at least one second touch electrode TL. In the sensing mode, the multiplexer 202 may electrically connect the first touch electrode RLi to the first node N1. The detection signal Ri from the first touch electrode RLi may be transmitted to the amplifier region 201 through the first node N1. In some example embodiments, the plurality of driving signals may be sequentially provided to the plurality of second touch electrodes during each horizontal period 1H. For example, when the driving signals are provided to the first-second electrode and the second-second electrode in the first horizontal period 1H within one frame period (1 FRAME), the driving signals may be provided to the third-second electrode and the fourth-second electrode in the second horizontal period 1H.

In some example embodiments, the selection signal SEL may transit from the logic level "L" to the logic level "H" within the horizontal blank period HBLANK. When the selection signal SEL is at the logic level "H", the gate driver 122 and the transceiver 111 may operate in the sensing mode. When the selection signal SEL is at the logic level "L", the gate driver 122 and the transceiver 111 may operate in the driving mode. That is, during a period excluding a partial section of the horizontal blank period HBLANK and the horizontal blank period HBLANK of one horizontal period 1H, the gate driver 122 and the transceiver 111 may operate in the driving mode.

Figure 5:
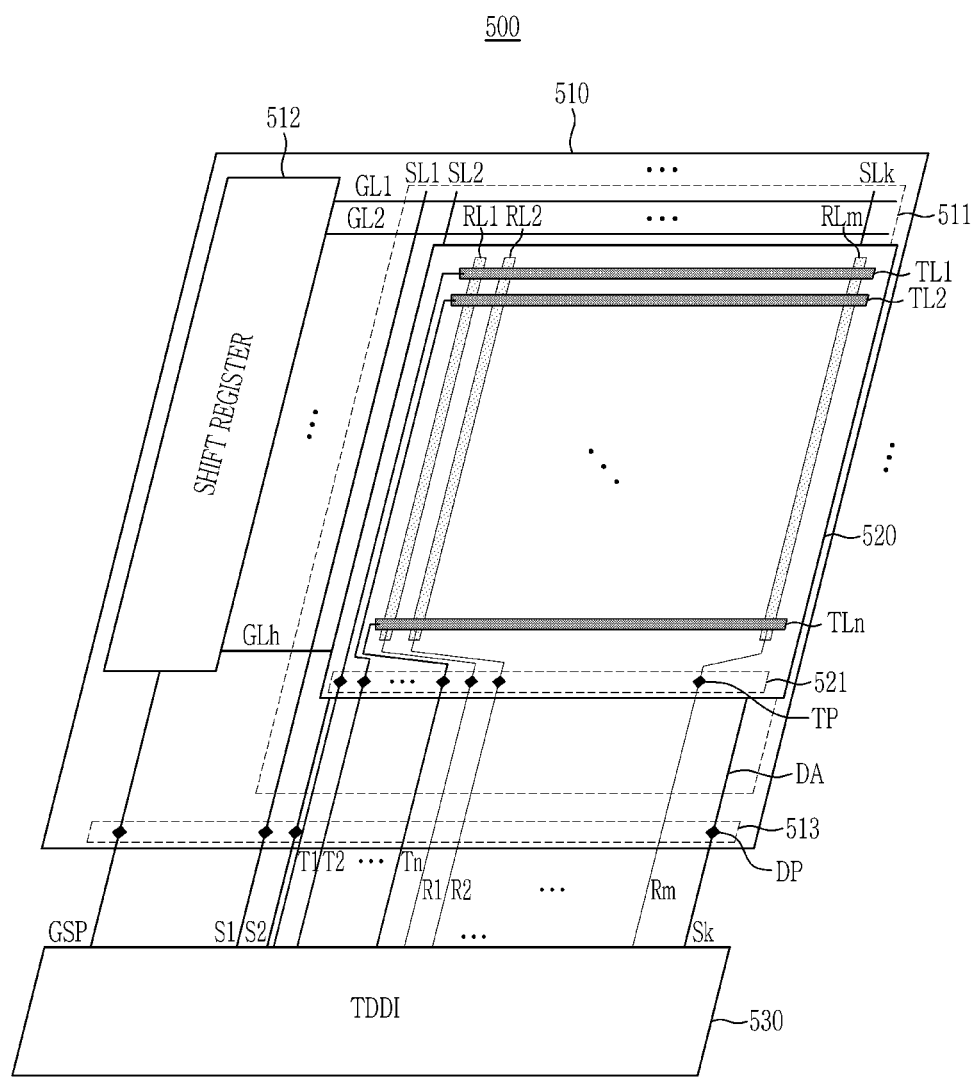
FIG. 5 is a diagram schematically illustrating a structure of the display device according to the example embodiment.

FIG. 5 is a diagram schematically illustrating a structure of the display device according to the example embodiment.

Referring to FIG. 5, the display device 500 may include a first panel 510, a second panel 520, and a driving circuit 530. The second panel 520 may be positioned on the first panel 510. The first panel 510 and the second panel 520 may be the panel 120 of FIG. 1.

The first panel 510 may include a display area 511, a shift register 512 and a pad region 513 disposed around the display area 511. A plurality of gate lines GL1, GL2, ..., GLh and a plurality of source lines SL1, SL2, ..., SLk may be positioned in the first panel 510. The plurality of gate lines GL1, GL2, ..., GLh and the plurality of source lines SL1, SL2, ..., SLk may cross in the display area 511.

The shift register 512 may be connected to the plurality of gate lines GL1, GL2, ..., GLh. The shift register 512 may generate a plurality of gate signals by a gate start pulse GSP received from the driving circuit 530 and transmit the plurality of gate signals to the plurality of gate lines GL1, GL2, ..., GLh.

The pad region 513 may include a plurality of first pads DP. Some of the plurality of first pads DP may be connected to the plurality of source lines SL1, SL2, ..., SLk. At least one of the plurality of first pads DP may be connected to the shift register 512. The plurality of first pads DP may transmit various signals GSP, S1, S2, ..., Sk applied by the driving circuit 530 to the first panel 510 to the plurality of source lines SL1, SL2, ..., SLk and the shift register 512.

The second panel 520 may be positioned on the first panel 510. The second panel 520 may include a plurality of first touch electrodes RL1, RL2, ..., RLn, a plurality of second touch electrodes TL1, TL2, ..., TLn, and a pad region 521. The plurality of first touch electrodes RL1, RL2, ..., RLn and the plurality of second touch electrodes TL1, TL2, ..., TLn may be positioned to overlap the display area 511 on a plane. The plurality of first touch electrodes RL1, RL2, ..., RLn may extend in a second direction and may be arranged in a first direction. The plurality of second touch electrodes TL1, TL2, ..., TLn may extend in the first direction and may be arranged in the second direction crossing the first direction. For example, the plurality of first touch electrodes RL1, RL2, ..., RLn may intersect the plurality of second touch electrodes TL1, TL2, ..., TLn.

The pad region 521 may include a plurality of second pads TP. Some of the plurality of second pads TP may be connected to the plurality of second touch electrodes TL1, TL2, ..., TLn. At least some of the plurality of second pads TP may transmit the plurality of driving signals T1, T2, ..., Tn applied to the second panel by the driving circuit 530 to the plurality of second touch electrodes TL1, TL2, ..., TLn. Other some of the plurality of second pads TP may be connected to the plurality of first touch electrodes RL1, RL2, ..., RLn. Another some of the plurality of second pads TP may transmit the plurality of detection signals R1, R2, ..., Rm from the plurality of first touch electrodes RL1, RL2, ..., RLn to the driving circuit 530.

The driving circuit 530 may be electrically connected to the pad part 513 of the first panel 510 and electrically connected to the pad part 521 of the second panel 520. The driving circuit 530 may transmit various signals GSP, S1, S2, ..., Sk to the first panel 510 through the pad part 513. The driving circuit 530 may transmit a plurality of driving signals T1, T2, ..., Tn to the second panel 520 through the pad part 521. The driving circuit 530 may receive the plurality of detection signals R1, R2, ..., Rm from the second panel 520 through the pad part 521.

Figure 6:
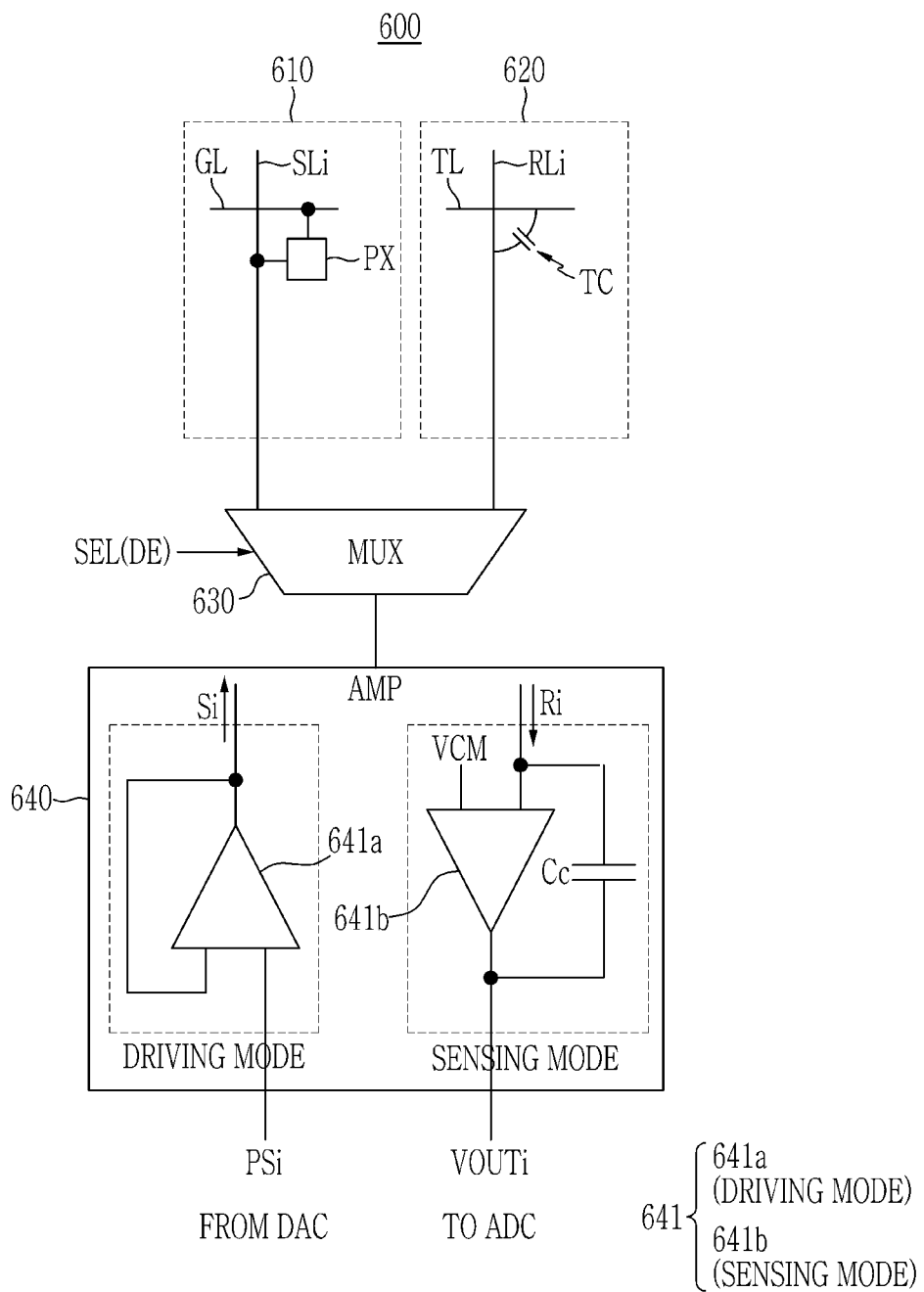
FIG. 6 is a block diagram illustrating a connection relationship between a semiconductor device and a pixel and a touch element according to an example embodiment.

FIG. 6 is a block diagram illustrating a connection relationship between the semiconductor device, a pixel and a touch element according to the example embodiment. The semiconductor device may be an electronic device.

Referring to FIG. 6, a semiconductor device 600 may include a first panel 610, a second panel 620, a multiplexer 630 and an amplifier region AMP 640. The first panel 610 may include a pixel PX connected to a gate line GL and a source line SLi. The second panel 620 may include a first touch electrode RL and a second touch electrode TL. The first touch electrode RL and the second touch electrode TL may form a touch capacitance TC.

The multiplexer 630 may include a first terminal connected to the source line SLi of the first panel 610, a second terminal connected to the first touch electrode RLi of the second panel 620, and a third terminal connected to the amplifier region AMP 640. The multiplexer 630 may electrically connect the first terminal and the third terminal or electrically connect the second terminal and the third terminal according to the level of the selection signal SEL (or the data enable signal DE). For example, the multiplexer 630 may electrically connect the source line SLi and the amplifier region 640 or electrically connect the first touch electrode RLi and the amplifier region 640 according to the level of the selection signal SEL (or the data enable signal DE). The source line SLi of the first panel 610 and the first touch electrode RLi of the second panel 620 may be respectively connected to the first terminal and the second terminal of the multiplexer 630. The amplifier region 640 may be connected to the third terminal of the multiplexer 630.

The amplifier region 640 may include one amplifier 641. According to an example embodiment, the amplifier 641 may operate as an amplifier 641a in a driving mode and may operate as an amplifier 641b in a sensing mode. According to an example embodiment, in the driving mode, an amplifier 641a may receive the input signal PSi from the DAC, amplify the received signal PSi, and output the amplified signal to the source line SLi as the data signal Si. According to an example embodiment, in the sensing mode, the amplifier 641b may operate as an integrator. A first input terminal between two input terminals of the amplifier 641b may be electrically connected to the first touch electrode RLi. A common voltage VCM may be applied to a second input terminal among two input terminals of an amplifier 641b. An output terminal of the amplifier 641b may be connected to the ADC. The capacitor Cc may be connected between the first input terminal and the output terminal of the amplifier 641b. The amplifier 641b may receive the detection signal Ri from the first touch electrode RLi, charge the detection signal Ri in the capacitor Cc, amplify the detection signal Ri, and output the amplified signal to the ADC as an output signal VOUTi.

Figure 7A:
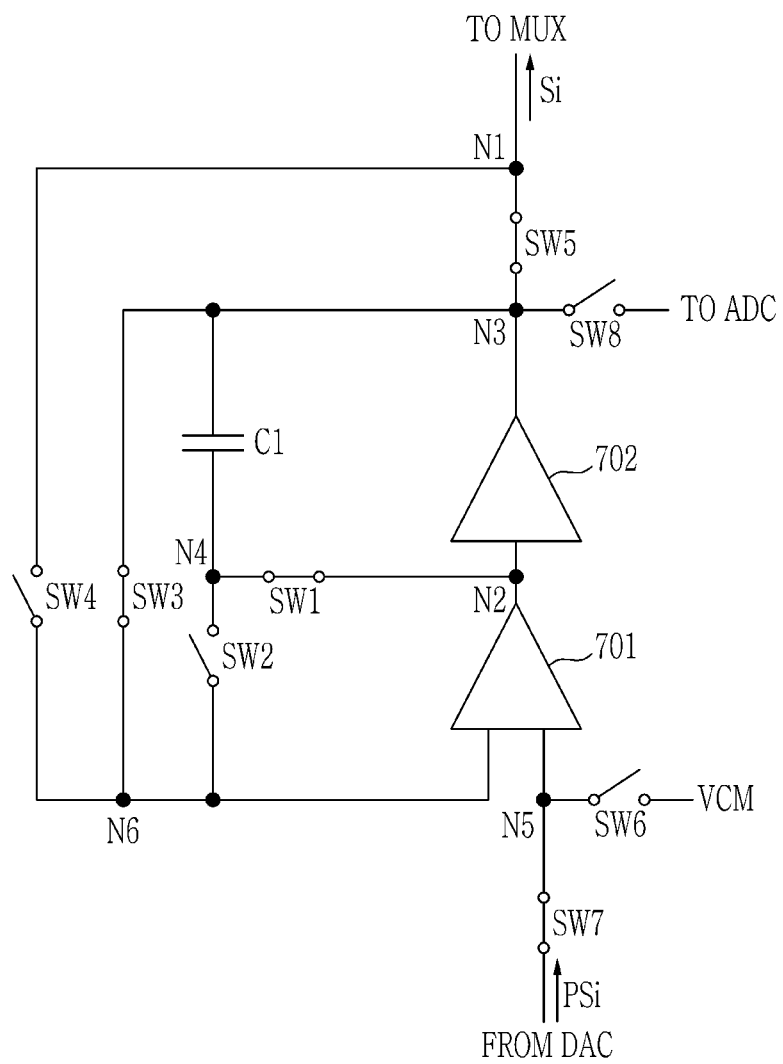
FIG. 7A and FIG. 7B are circuit diagrams illustrating an amplifier region of the semiconductor device according to an example embodiment.
Figure 7B:
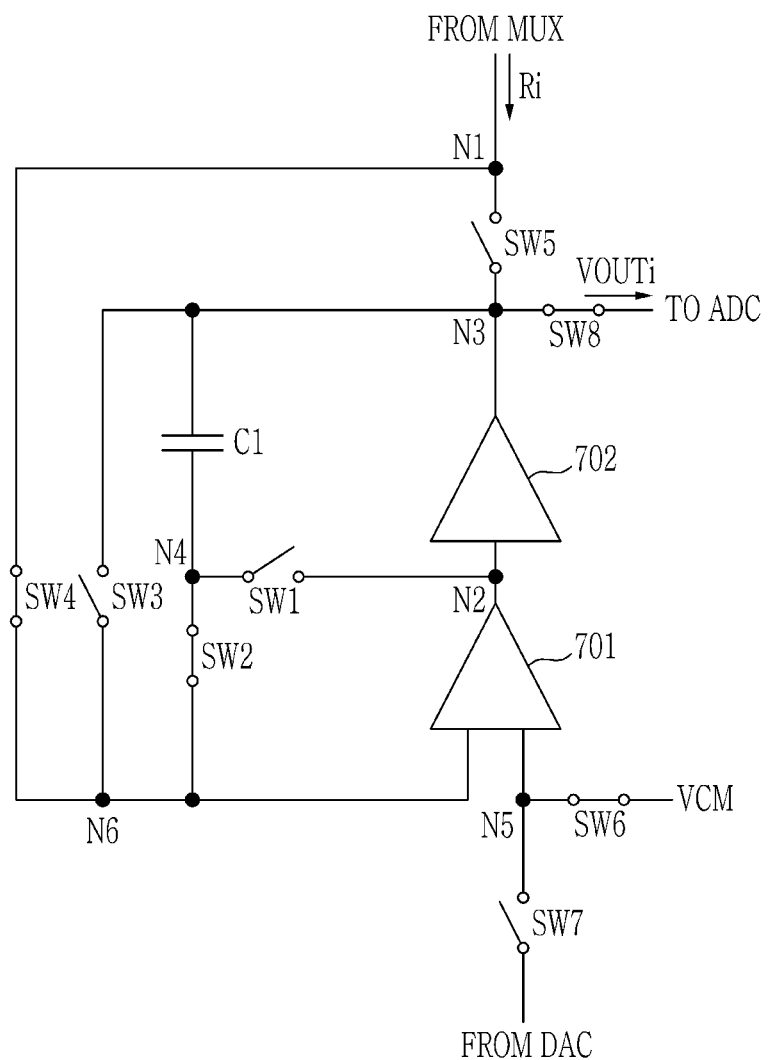

FIGS. 7A and 7B are circuit diagrams illustrating the amplifier region of the semiconductor device according to the example embodiment.

Referring to FIGS. 7A and 7B, the amplifier region 700 may be connected to a multiplexer at the first node N1. The amplifier region 700 may include a plurality of amplifiers 701 and 702, a capacitor C1, and a plurality of switches SW1, ..., SW8.

An output terminal of the first amplifier 701 may be connected to an input terminal of a second amplifier 702 at the second node N2. The second node N2 may be connected to a fourth node N4 through the switch SW1. The first input terminal of the first amplifier 701 may be connected to the DAC through the switch SW7 at a fifth node N5. The first input terminal of the first amplifier 701 may receive the common voltage VCM through the switch SW6 at the fifth node N5. The second input terminal of the first amplifier 701 may be connected to the fourth node N4 through the switch SW2 at a sixth node N6. The second input terminal of the first amplifier 701 may be connected to the third node N3 through the switch SW3 at the sixth node N6. The second input terminal of the first amplifier 701 may be connected to the first node N1 through the switch SW4 at the sixth node N6.

An output terminal of the second amplifier 702 may be connected to the third node N3. The third node N3 may be connected to the ADC through the switch SW8. The third node N3 may be connected to the first node N1 through the switch SW5.

The first switch SW1 may be connected between the second node N2 and the fourth node N4. The second switch SW2 may be connected between the fourth node N4 and the sixth node N6. The third switch SW3 may be connected between the third node N3 and the sixth node N6. The fourth switch SW4 may be connected between the first node N1 and the sixth node N6. The fifth switch SW5 may be connected between the first node N1 and the third node N3. The sixth switch SW6 may be connected between the fifth node N5 and a common voltage supply terminal. A seventh switch SW7 may be connected between the fifth node N5 and the DAC. The eighth switch SW8 may be connected between the third node N3 and the ADC. A first electrode of the capacitor C1 may be connected to the third node N3, and a second electrode may be connected to the fourth node N4. Each of the plurality of switches SW1, ..., SW8 may be an n-type transistor or a p-type transistor, and may include switches having various structures in addition to the transistor.

FIG. 7A illustrates the amplifier region 700 in the drive mode. Referring to FIG. 7A, the switches SW1, SW3, SW5, and SW7 may be turned on, and the switches SW2, SW4, SW6, and SW8 may be turned off. The input signal PSi transmitted from the DAC may be amplified by the first amplifier 701 and the second amplifier 702 and output the amplified signal to the multiplexer as a data signal Si. The multiplexer may electrically connect the source line (SLi of FIG. 6) and the third node N3. Accordingly, the data signal Si may be output to the source line SLi.

FIG. 7B illustrates the amplifier region 700 in the sensing mode. Referring to FIG. 7B, the switches SW2, SW4, SW6, and SW8 may be turned on, and the switches SW1, SW3, SW5, and SW7 may be turned off. The multiplexer may electrically connect the first touch electrode (RLi of FIG. 6) and the sixth node N6. Accordingly, the detection signal Rj transmitted from the multiplexer may be charged in the capacitor C1, amplified by the first amplifier 701 and the second amplifier 702, and output to the ADC through the third node N3 as the output signal VOUTi.

According to the example embodiment, since the amplifier region 700 may selectively operate in the driving mode or the sensing mode, it is possible to provide a more compact TDDI than a conventional touch display driver integrated circuit (TDDI) including both an amplifier for sensing a touch input and an amplifier for outputting a data signal.

In addition, according to the example embodiment, since the operation of sensing a touch and the operation of displaying an image is performed by time division is performed, the image quality may be improved and the accuracy of the touch input may be improved by reducing the coupling of signals that may occur between the two operations.

Figure 8:
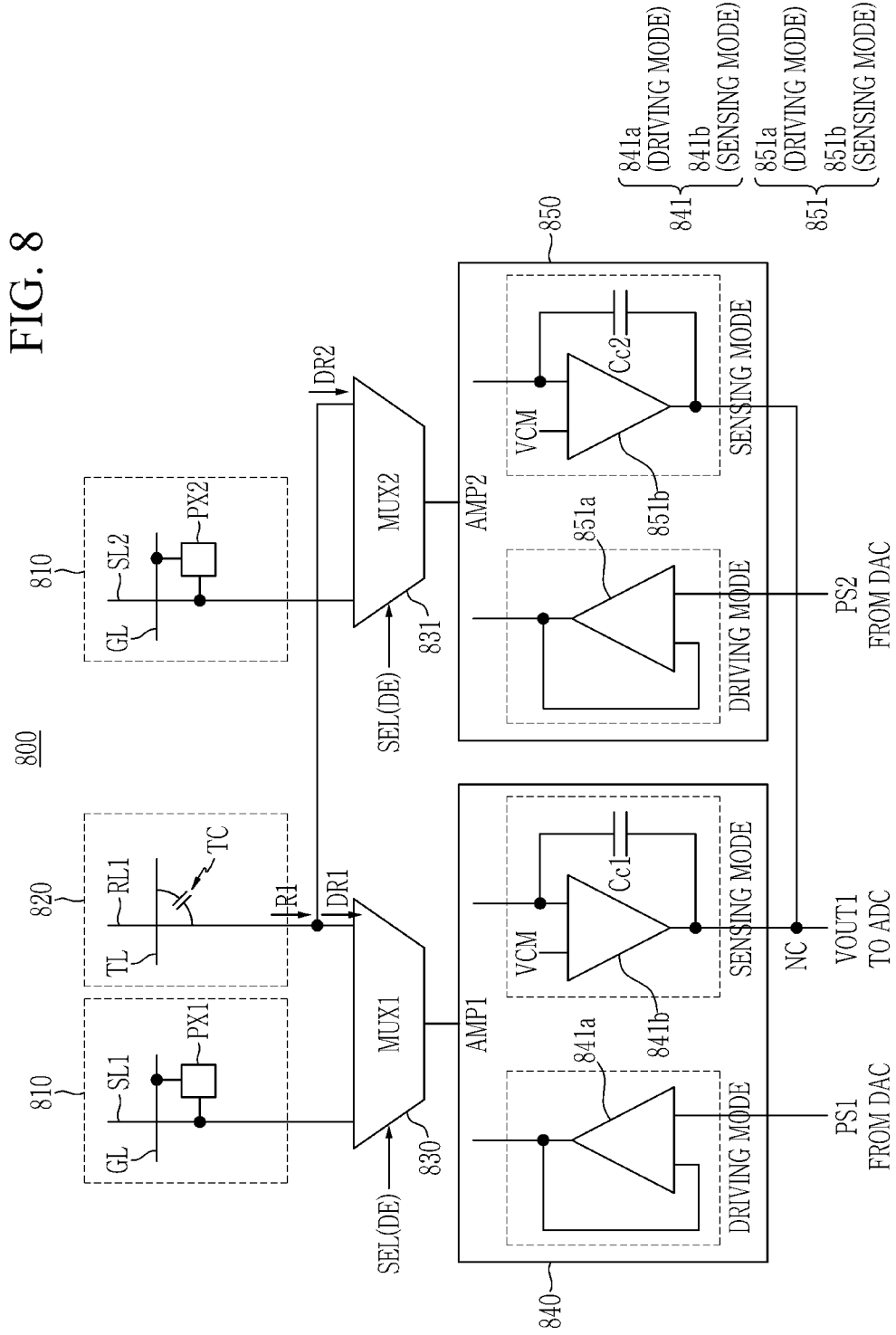
FIG. 8 is a block diagram illustrating a connection relationship between a semiconductor device and a pixel and a touch element according to an example embodiment.

FIG. 8 is a block diagram illustrating a connection relationship between a semiconductor device 800 and a pixel and a touch element according to an example embodiment.

Referring to FIG. 8, the semiconductor device 800 may includes a first panel 810, a second panel 820, a first multiplexer 830, a second multiplexer 831, a first amplifier region AMP1 840 and a second amplifier region AMP2 850. The first panel 810 may include a pixel PX1 connected to a gate line GL and a source line SL1 and a pixel PX2 connected to the gate line GL and a source line SL2. The second panel 820 may include a second touch electrode TL and a first touch electrode RL1. The second touch electrode TL and the first touch electrode RL1 may form a touch capacitance TC. Here, the first panel 810 may be the first panel 510 of FIG. 5, and the second panel 820 may be the second panel 520 of FIG. 5.

The source line SL1 of the first panel 810 and the first touch electrode RL1 of the second panel 820 may be respectively connected to a first terminal and a second terminal of the first multiplexer MUX1 830. The source line SL2 of the first panel 810 and the first touch electrode RL1 of the second panel 820 may be respectively connected to the first terminal and the second terminal of the second multiplexer MUX2 831. The first amplifier region AMP1 840 may be connected to an output terminal of the first multiplexer MUX1 830. The amplifier region AMP2 850 may be connected to an output terminal of the second multiplexer MUX2 831. The first multiplexer MUX1 830 may electrically connect the source line SL1 and the first amplifier region AMP1 840, or electrically connect the first touch electrode RL1 and the first amplifier region AMP1 840 according to the level of the selection signal SEL (or the data enable signal DE). The second multiplexer MUX2 831 may electrically connect the source line SL2 and the second amplifier region AMP2 850, or electrically connect the first touch electrode RL1 and the second amplifier region AMP2 850 according to the level of the selection signal SEL (or the data enable signal DE).

In the example embodiment, the first touch electrode RL1 may be connected to one second pad (TP in FIG. 5) of the second panel 820 and the first multiplexer MUX1 830 and the second multiplexer MUX2 831 may be connected to one node inside the driving circuit (530 of FIG. 5) connected to one second pad TP.

In the example embodiment, the first touch electrode RL1 may be connected to both two second pads TP at one node inside the second panel 820, and the first multiplexer MUX1 830 may be connected to one of the two second pads TP, and the second multiplexer MUX2 831 may be connected to another one of the two second pads TP.

Each of the first amplifier region AMP1 840 and the second amplifier region AMP2 850 may include one amplifier. For example, the first amplifier region AMP1 840 may include a first amplier 841, and the second amplifier region AMP2 850 may include a second amplifier 851. The first amplier 841 may be configured to operate as an amplifier 841a in the driving mode, and operate as an amplifier 841b in the sensing mode. Moreover, the second amplier 851 may be configured to operate as an amplifier 851a in the driving mode, and operate as an amplifier 851b in the sensing mode. In the driving mode, the amplifier 841a may receive the input signal PS1 from the DAC, amplify the received signal, and output the amplified signal to the source line SL1 as a data signal S1. In the driving mode, the amplifier 851a may receive the input signal PS2 from the DAC, amplify the received signal, and output the amplified signal to the source line SL2 as a data signal S2. In the sensing mode, the amplifiers 841b and 851b may operate as integrators. A first input terminal among two input terminals of the amplifier 841b and a first input terminal among two input terminals of the amplifier 851b may be electrically connected to the first touch electrode RL1. That is, the first touch electrode RL1 may be electrically connected to a first input terminal of each of the plurality of amplifiers 841b and 851b. A common voltage VCM may be applied to a second input terminal between two input terminals of the amplifier 841b and a second input terminal among two input terminals of the amplifier 851b. The output terminal of the amplifier 841b and the output terminal of the amplifier 851b may be connected together to the same ADC. For example, the output terminal of the amplifier 841b and the output terminal of the amplifier 851b may be connected together to the node NC, and the node NC may be connected to the ADC. The capacitor Cc1 may be connected between the first input terminal of the amplifier 841b and the output terminal of the amplifier 841b. The capacitor Cc2 may be connected between the first input terminal of the amplifier 851b and the output terminal of the amplifier 851b. The amplifier 841b and the amplifier 851b may receive the divided detection signal R1 from the same first touch electrode RL1, charge the received detection signals R1 to the capacitor Cc1 and the capacitor Cc2, respectively, and amplify the signal, and output the amplified signal to the same ADC as an output signal VOUT1. For example, the detection signal R1 may be distributed and input as distributed detection signals DR1 and DR2 to the multiplexer MUX1 830 and the multiplexer MUX2 831, respectively. The amplifier 841b may amplify the distributed detection signal DR1 and output the amplified signal to the node NC, and the amplifier 851b may amplify the distributed detection signal DR2 and output the amplified signal to the node NC. Signals output to the node NC by the respective amplifiers 841b and 851b connected to the same first touch electrode RL1 may be combined and output as the output signal VOUT1.

According to the example embodiment, the plurality of amplifier regions 840 and 850 is connected together to one first touch electrode RL1, and the detection signal R1 transmitted from the first touch electrode RL1 is divided and is charged in the capacitor Cc1 and the capacitor Cc2, so that the capacity of the capacitor for storing the electric charge according to the detection signal R1 may be increased without adding a capacitor or changing the size of the capacitor.

Figure 9:
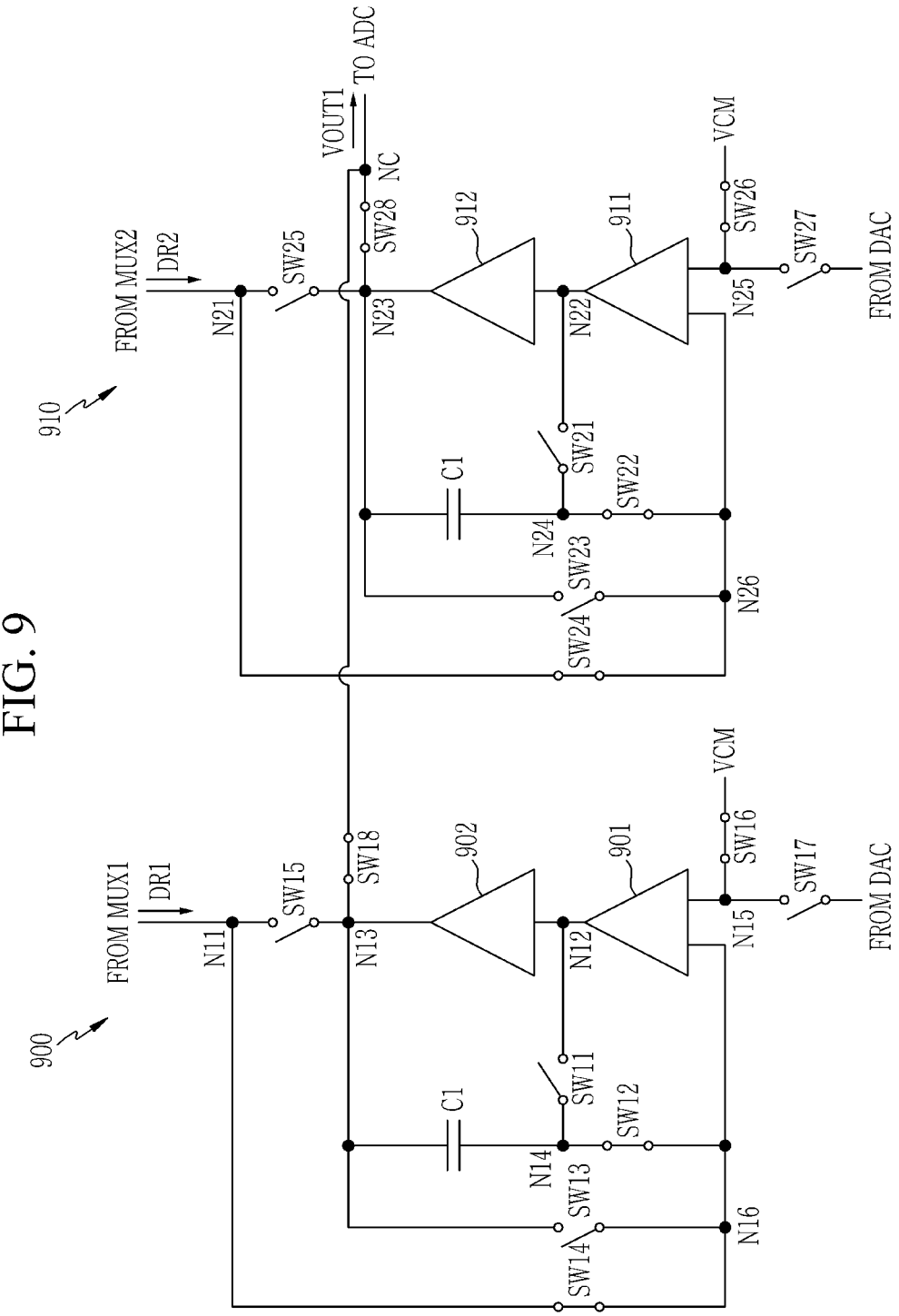
FIG. 9 is a circuit diagram illustrating amplifier regions of the semiconductor device according to an example embodiment.

FIG. 9 is a circuit diagram illustrating amplifier regions of the semiconductor device according to an example embodiment.

Referring to FIG. 9, the semiconductor device may include an amplifier region 900 and an amplifier region 910. The amplifier region 900 may be connected to a corresponding multiplexer MUX1 at a first node N11. The amplifier region 900 may include a plurality of amplifiers 901 and 902, a capacitor C11, and a plurality of switches SW11, . . . , SW18. The amplifier region 910 may be connected to a corresponding multiplexer MUX2 at a first node N21. The amplifier region 910 may include a plurality of amplifiers 911 and 912, a capacitor C21, and a plurality of switches SW21, . . . , SW28.

An output terminal of the first amplifier 901 may be connected to an input terminal of the second amplifier 902 at a second node N12. The second node N12 may be connected to a fourth node N14 through the switch SW11. The first input terminal of the first amplifier 901 may be connected to a DAC through the switch SW17 at a fifth node N15. The first input terminal of the first amplifier 901 may receive a common voltage VCM from the fifth node N15 through the switch SW16. The second input terminal of the first amplifier 901 may be connected to a fourth node N14 through the switch SW12. The second input terminal of the first amplifier 901 may be connected to a third node N13 through the switch SW13 at a sixth node N16. The second input terminal of the first amplifier 901 may be connected to the first node N11 through the switch SW14 at the sixth node N16. The output terminal of the second amplifier 902 may be connected to the third node N13 at the sixth node N16. The third node N13 may be connected to an ADC at a node NC through the switch SW18. The third node N13 may be connected to the first node N11 through the switch SW15.

The first switch SW11 may be connected between the second node N12 and the fourth node N14. The second switch SW12 may be connected between the fourth node N14 and the sixth node N16. The third switch SW13 may be connected between the third node N13 and the sixth node N16. The fourth switch SW14 may be connected between the first node N11 and the sixth node N16. The fifth switch SW15 may be connected between the first node N11 and the third node N13. The sixth switch SW16 may be connected between the fifth node N15 and the common voltage supply terminal. The seventh switch SW17 may be connected between the fifth node N15 and the DAC. The eighth switch SW18 may be connected between the third node N13 and the node NC. One electrode of the capacitor C1 may be connected to the third node N13, and the other electrode may be connected to the fourth node N14.

The output terminal of the first amplifier 911 may be connected to the input terminal of the second amplifier 912 at a second node N22. The second node N22 may be connected to the fourth node N24 through the switch SW21. The first input terminal of the first amplifier 911 may be connected to the DAC through the switch SW27 at a fifth node N25. The first input terminal of the first amplifier 911 may receive the common voltage VCM from the fifth node N25 through the switch SW26. The second input terminal of the first amplifier 911 may be connected to the fourth node N24 through the switch SW22 at a sixth node N26. The second input terminal of the first amplifier 911 may be connected to a third node N23 through the switch SW23 at the sixth node N26. The second input terminal of the first amplifier 911 may be connected to the first node N21 through the switch SW24 at the sixth node N26. An output terminal of the second amplifier 912 may be connected to the third node N23. The third node N23 may be connected to the ADC at the node NC through the switch SW28. The third node N23 may be connected to the first node N21 through the switch SW25.

The first switch SW21 may be connected between the second node N22 and the fourth node N24. The second switch SW22 may be connected between the fourth node N24 and the sixth node N26. The third switch SW23 may be connected between the third node N23 and the sixth node N26. The fourth switch SW24 may be connected between the first node N21 and the sixth node N26. The fifth switch SW25 may be connected between the first node N21 and the third node N23. The sixth switch SW26 may be connected between the fifth node N25 and a common voltage supply terminal. The seventh switch SW27 may be connected between the fifth node N25 and the DAC. The eighth switch SW28 may be connected between the third node N23 and the node NC. One electrode of the capacitor C1 may be connected to the fourth node N24, and the other electrode may be connected to the fourth node N24.

FIG. 9 illustrates the amplifier regions 900 and 910 in the sensing mode. Referring to FIG. 9, the switches SW12, SW14, SW16, SW18, SW22, SW24, SW26, and SW28 may be turned on, and the switches SW11, SW13, SW15, SW17, SW21, SW23, SW25, and SW27 may be turned off. The distributed detection signal DR1 transmitted from the multiplexer MUX1 may be charged in the capacitor C11, amplified by the first amplifier 901 and the second amplifier 902, and transmitted to the node NC, and the distributed detection signal DR2 transmitted from the multiplexer MUX2 may be charged in the capacitor C21, amplified by the first amplifier 911 and the second amplifier 912, and transmitted to the node NC. The signals transmitted to the node NC may be combined and output to the ADC as an output signal VOUT1.

Figure 10:
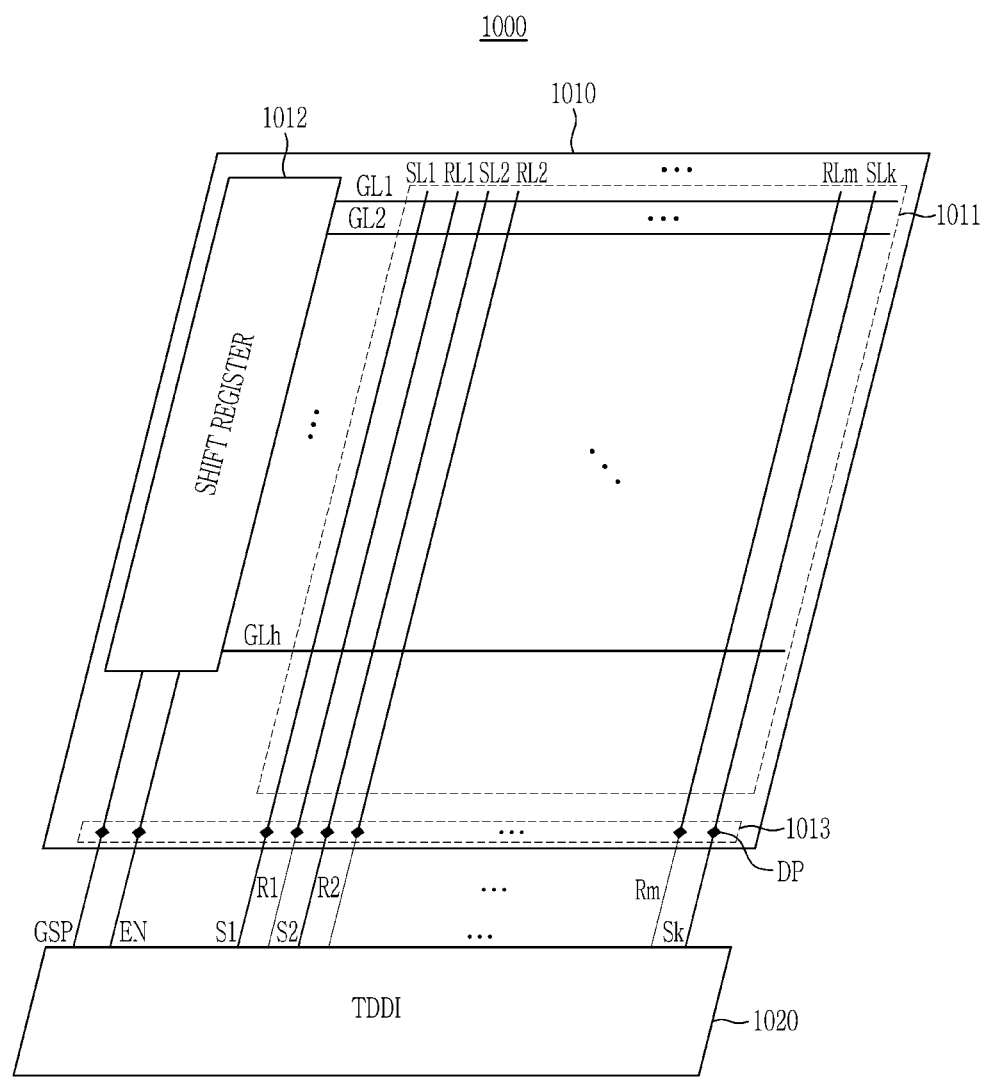
FIG. 10 is a diagram schematically illustrating a structure of the touch-enabled display device according to the example embodiment.

FIG. 10 is a diagram schematically illustrating a structure of the touch-enabled display device according to the example embodiment.

Referring to FIG. 10, a display device 1000 may include a panel 1010 and a driving circuit 1020. The panel 1010 may be the panel 120 of FIG. 1.

The panel 1010 may include a display area 1011, a shift register 1012 and a pad region 1013 disposed around the display area 1011. In the panel 1010, a plurality of gate lines GL1, GL2, . . . , GLh, a plurality of first touch electrodes RL1, RL2, . . . , RLm, and a plurality of source lines SL1, SL2, . . . , SLk may be positioned. A plurality of gate lines GL1, GL2, . . . , GLh and a plurality of source lines SL1, SL2, . . . , SLk may cross in the display area 1011. The plurality of gate lines GL1, GL2, . . . , GLh and the plurality of first touch electrodes RL1, RL2, . . . , RLm may cross in the display area 1011.

The shift register 1012 may be connected to the plurality of gate lines GL1, GL2, . . . , GLh. The shift register 1012 may generate a plurality of gate signals by a gate start pulse GSP received from the driving circuit 1020 and transmit the plurality of gate signals to the plurality of gate lines GL1, GL2, . . . , GLh. In some example embodiments, the shift register 1012 may generate a plurality of driving signals according to the enable signal EN received from the driving circuit 1020, and transmit the plurality of driving signals to at least one of the plurality of gate lines GL1, GL2, GLh. The driving signal may be a signal that transits between two voltage levels a plurality of times, and the gate signal may be a signal that transits between two voltage levels twice.

The pad region 1013 may include a plurality of pads DP. Some of the plurality of pads DP may be connected to the plurality of source lines SL1, SL2, . . . , SLk. Other portions of the plurality of pads DP may be connected to the plurality of first touch electrodes RL1, RL2, . . . , RLm. At least one of the plurality of pads DP may be connected to the shift register 1012. Some of the plurality of pads DP may transmit various signals GSP, EN, S1, S2, . . . , Sk applied to the panel 1010 by the driving circuit 1020 to the plurality of source lines SL1, SL2, . . . , SLk and the shift register 1012. Other portions of the plurality of pads DP may transmit the plurality of detection signals R1, R2, . . . , Rm from the plurality of first touch electrodes RL1, RL2, . . . , RLn to the driving circuit 1020.

The driving circuit 1020 may include a plurality of multiplexers and a plurality of amplifier regions. Each of the plurality of multiplexers may be connected to one corresponding source line among the plurality of source lines SL1, SL2, . . . , SLk, one corresponding first touch electrode among the plurality of first touch electrodes RL1, RL2, . . . , RLn, and one corresponding amplifier region among the plurality of amplifier regions. In some example embodiments, one first touch electrode may be connected to a plurality of multiplexers, as described with reference to FIG. 8.

Figure 11:
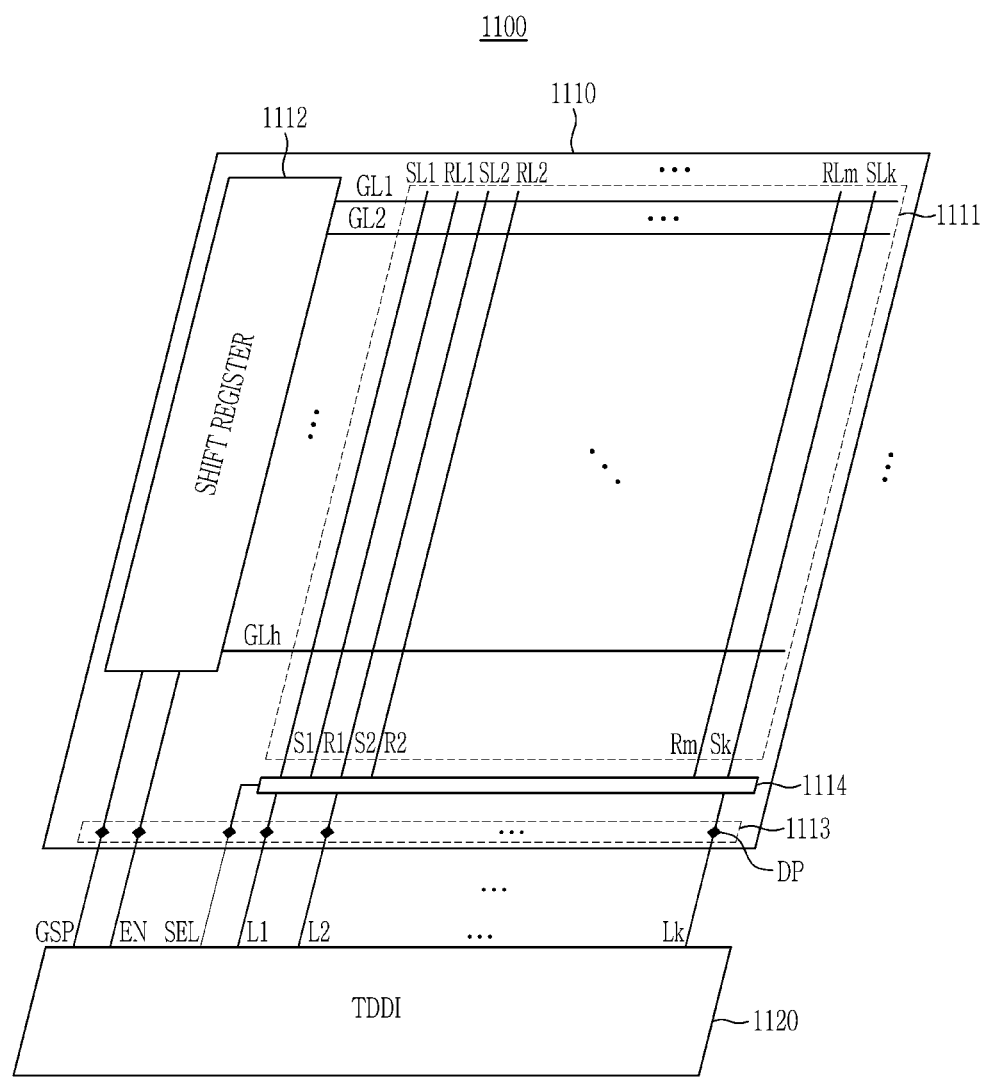
FIG. 11 is a diagram schematically illustrating a structure of the touch-enabled display device according to the example embodiment.

FIG. 11 is a diagram schematically illustrating a structure of the touch-enabled display device according to the example embodiment.

Compared to the structure of FIG. 10, in the structure of FIG. 11, the panel 1110 may further include a multiplexer region 1114.

The multiplexer region 1114 may include a plurality of multiplexers. Each of the plurality of multiplexers may be connected to one corresponding source line among the plurality of source lines SL1, SL2, . . . , SLk, one corresponding first touch electrode among the plurality of first touch electrodes RL1, RL2, . . . , RLn, and one corresponding pad among the plurality of pads DP. In some example embodiments, one first touch electrode may be connected to a plurality of multiplexers, as described with reference to FIG. 8.

In the example embodiment, a selection signal SEL may be provided to each of the plurality of multiplexers. Each of the plurality of multiplexers may electrically connect one corresponding source line and one corresponding pad or electrically connect one corresponding first touch electrode and one corresponding pad according to the level of the selection signal SEL.

The pad region 1113 may include a plurality of pads DP. Some of the plurality of pads DP may be connected to the multiplexer region 1114. Some of the plurality of pads DP may be connected to the multiplexer region 1114. At least one of the plurality of pads DP may be connected to a shift register 1112. The plurality of pads DP may transmit various signals GSP, EN, SEL, S1, S2, . . . , Sk applied by the driving circuit 1120 to the panel 1110 to the multiplexer region 1114 and the shift register 1112. Some of the plurality of pads DP may transmit a plurality of detection signals R1, R2, . . . , Rm from the plurality of first touch electrodes RL1, RL2, . . . , RLn to a driving circuit 1120 through the multiplexer region 1114.

The driving circuit 1120 may include a plurality of amplifier regions. Each of the plurality of amplifier regions may be electrically connected to a corresponding pad among the plurality of pads DP.

According to the example embodiment, since the multiplexer region 1114 is positioned on the panel 1110, the number of pads DP positioned in the pad region 1113 may be reduced. Also, according to the example embodiment, the size of the driving circuit 1120 may be reduced.

Figure 12:
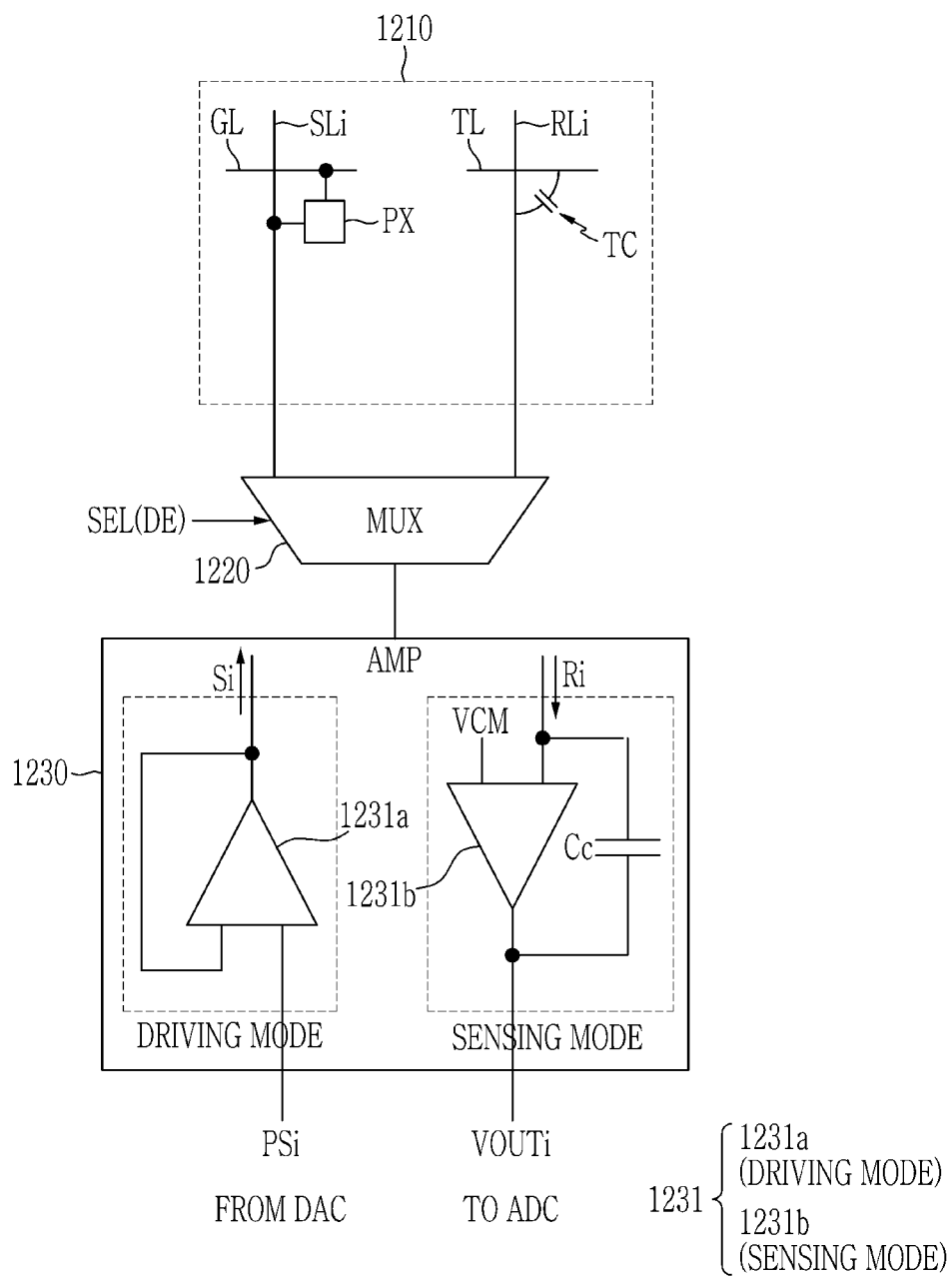
FIG. 12 is a block diagram illustrating a connection relationship between a semiconductor device and a pixel and a touch element according to an example embodiment.

FIG. 12 is a block diagram illustrating a connection relationship between a semiconductor device 1200, a pixel and a touch element according to an example embodiment.

Among the constituent components of FIG. 12, descriptions of the same or similar parts as those of FIG. 6 will be omitted.

Referring to FIG. 12, the semiconductor 1200 may include a panel 1210, a multiplexer 1220 and an amplifier region 1230. The panel 1210 may include a pixel PX connected to a gate line GL and a source line SLi. Also, the panel 1210 may further include a first touch electrode RL. The gate line GL and the first touch electrode RL may form a touch capacitance TC.

The source line SLi and the first touch electrode RLi of the panel 1210 may be respectively connected to a first terminal and a second terminal of a multiplexer 1220. An amplifier region 1230 may be connected to an output terminal of the multiplexer 1220. The multiplexer 1220 may electrically connect the source line SLi and the amplifier region 1230 or electrically connect the first touch electrode RLi and the amplifier region 1230 according to the level of a selection signal SEL (or a data enable signal DE).

Although the multiplexer 1220 is illustrated as being positioned outside the panel 1210 in FIG. 12, the multiplexer 1220 may be positioned within the panel 1210 as described in FIG. 11.

Figure 13:
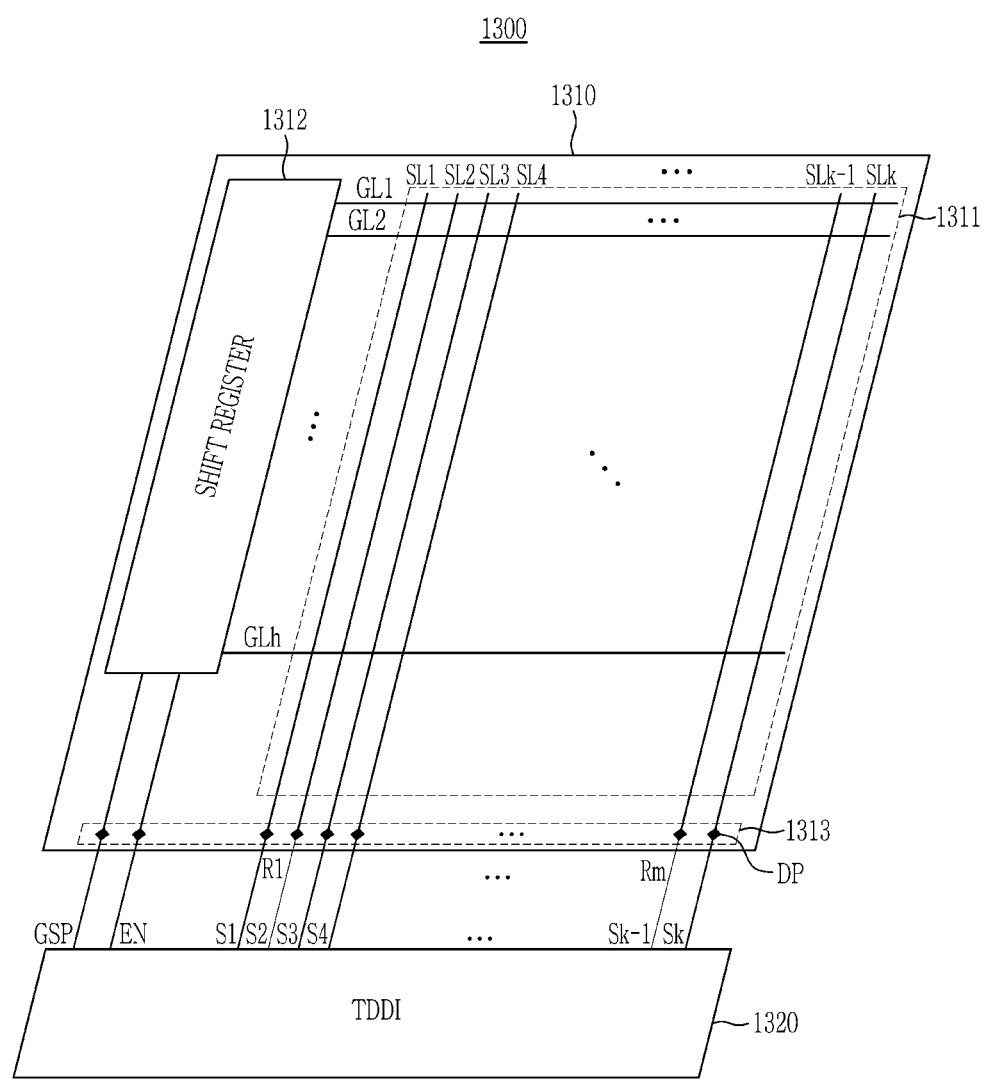
FIG. 13 is a diagram schematically illustrating a structure of the touch-enabled display device according to the example embodiment.

FIG. 13 is a diagram schematically illustrating a structure of the touch-enabled display device according to the example embodiment.

Referring to FIG. 13, a display device 1300 may include a panel 1310 and a driving circuit 1320. The panel 1310 may be the panel 120 of FIG. 1.

The panel 1310 may include a display area 1311, a shift register 1312 and a pad region 1313 disposed around the display area 1311. A plurality of gate lines GL1, GL2, . . . , GLh and a plurality of source lines SL1, SL2, . . . , SLk may be positioned in the panel 1310. The plurality of gate lines GL1, GL2, . . . , GLh and the plurality of source lines SL1, SL2, . . . , SLk may cross in the display area 1311.

The shift register 1312 may be connected to the plurality of gate lines GL1, GL2, . . . , GLh. The shift register 1312 may generate a plurality of gate signals by the gate start pulse GSP received from the driving circuit 1320 and transmit the plurality of gate signals to the plurality of gate lines GL1, GL2, . . . , GLh. In some example embodiments, the shift register 1312 may generate a plurality of driving signals according to the enable signal EN received from the driving circuit 1320, and transmit the plurality of driving signals to at least one of the plurality of gate lines GL1, GL2, . . . , GLh. The driving signal may be a signal that transits between two voltage levels several times, and the gate signal may be a signal that transits between two voltage levels once.

The pad region 1313 may include a plurality of pads DR. Some of the plurality of pads DP may be connected to the plurality of source lines SL1, SL2, . . . , SLk. Other portions of the plurality of pads DP may be connected to the plurality of first touch electrodes RL1, RL2, . . . , RLm. At least one of the plurality of pads DP may be connected to the shift register 1312. Some of the plurality of pads DP may transmit various signals GSP, EN, S1, S2, . . . , Sk applied to the panel 1310 by the driving circuit 1320 to the plurality of source lines SL1, SL2, . . . , SLk and the shift register 1312. At least some of the plurality of pads DP may transmit the plurality of detection signals R1, R2, . . . , Rm from at least one of the plurality of source lines SL1, SL2, . . . , SLk to the driving circuit 1320.

At least one of the plurality of source lines SL1, SL2, . . . , SLk may operate as a first touch electrode (RL of FIG. 1). The driving circuit 1320 may transmit data signals S2 and Sk−1 corresponding to at least one source line SL2, . . . , SLk−1 operating as the first touch electrode RL. The driving circuit 1320 may receive the detection signals R1, . . . , Rm from each of the at least one source line SL2, . . . , SLk−1 operating as the first touch electrode RL.

Figure 14:
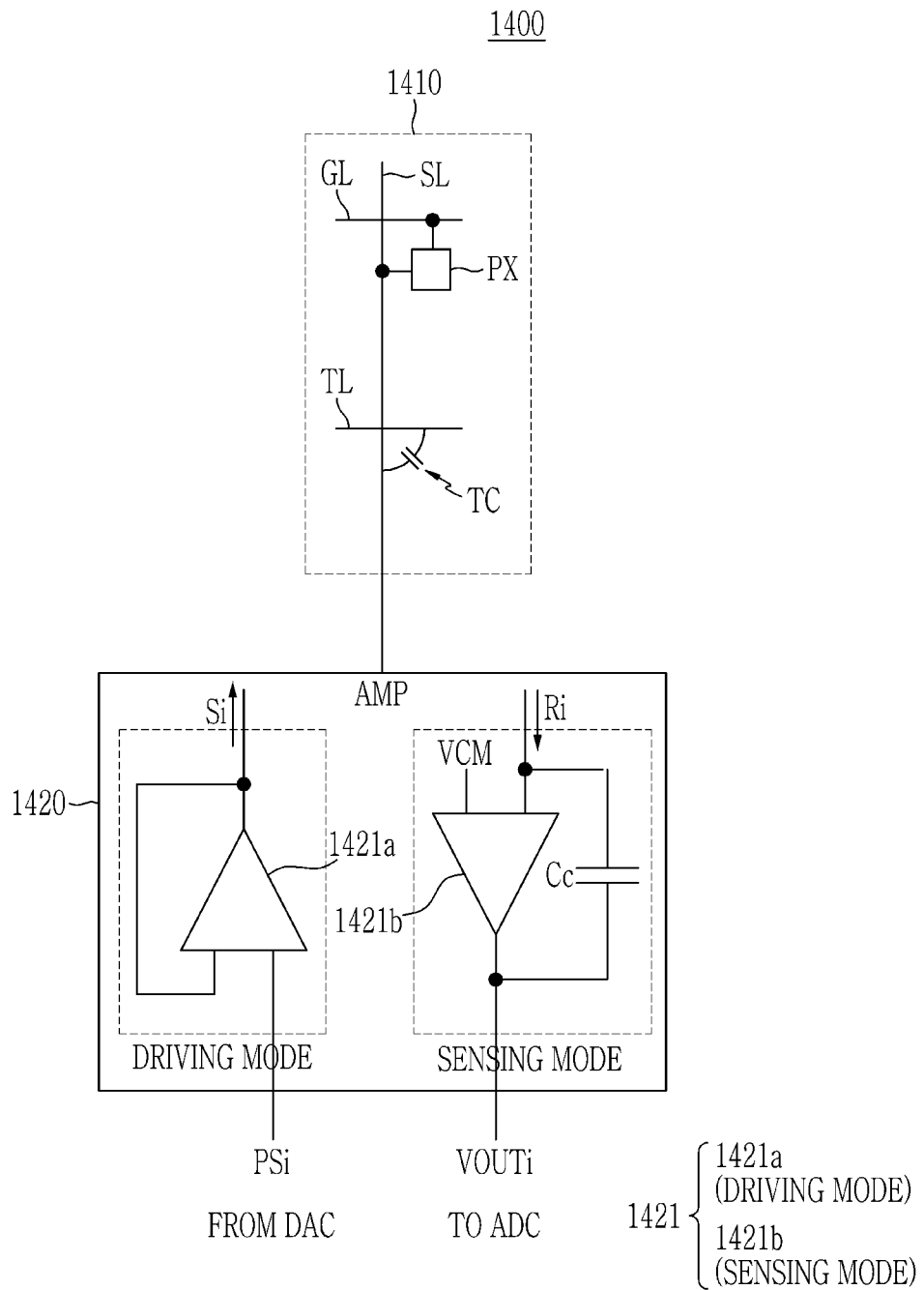
FIG. 14 is a block diagram illustrating a connection relationship between a semiconductor device and a pixel and a touch element according to an example embodiment.

FIG. 14 is a block diagram illustrating a connection relationship between a semiconductor device 1400, a pixel and a touch element according to an example embodiment.

Among the constituent components of FIG. 14, descriptions of the same or similar parts as those of FIG. 12 will be omitted.

Referring to FIG. 14, the semiconductor device may include a panel 1410, and an amplifier region 1420. The panel 1410 may include a pixel PX connected to a gate line GL1 and a source line SLi. Also, the gate line GL2 and the source line SLi may form a touch capacitance TC.

The source line SLi of the panel 1410 may be connected to an amplifier region 1420

The amplifier region 1420 may include one amplifier 1421. In the driving mode, an amplifier 1421a may receive the input signal PSi from a DAC, amplify the received signal, and output the amplified signal to the source line SLi as a data signal Si. In the sensing mode, an amplifier 1421b may operate as an integrator. A first input terminal between two input terminals of the amplifier 1421b may be electrically connected to the source line SLi. A common voltage VCM may be applied to a second input terminal between two input terminals of the amplifier 1421b. An output terminal of the amplifier 1421b may be connected to an ADC. A capacitor Cc may be connected between the first input terminal and the output terminal of the amplifier 1421b. The amplifier 1421b may receive the detection signal Ri from the source line SLi, charge the received signal in the capacitor Cc, amplify the signal, and output the amplified signal to the ADC as an output signal VOUTi.

Figure 15:
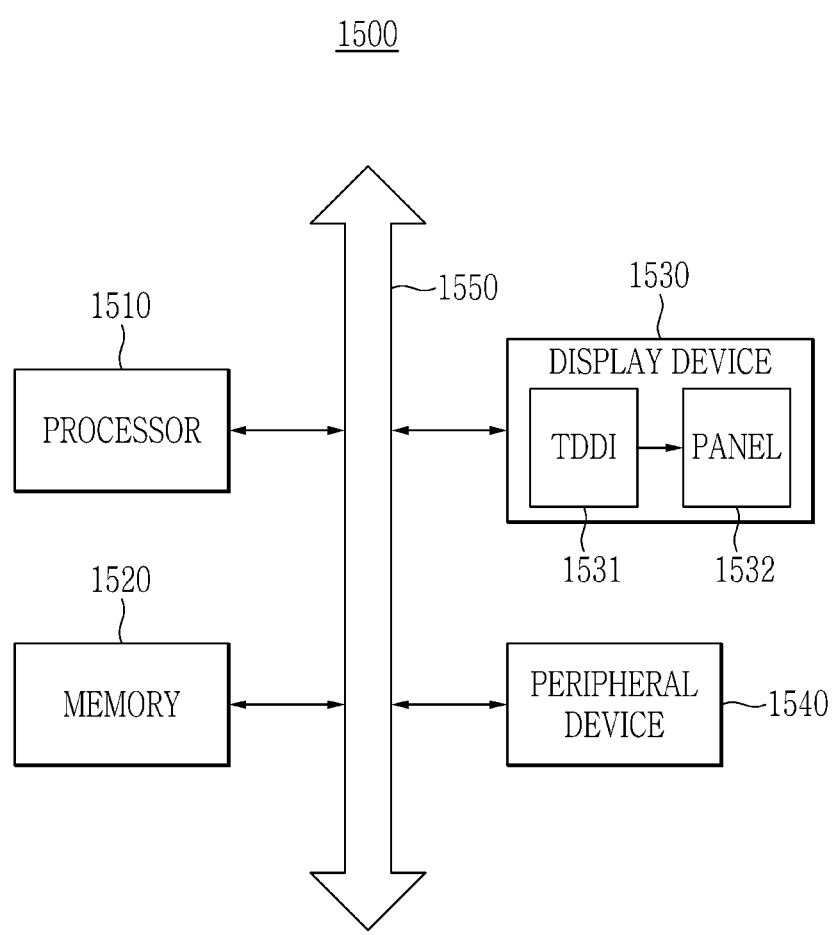
FIG. 15 is a diagram illustrating an electronic system according to an example embodiment.

FIG. 15 is a diagram illustrating an electronic system according to an example embodiment.

Referring to FIG. 15, an electronic system 1500 according to an example embodiment may include a processor 1510, a memory 1520, a display device 1530, and a peripheral device 1540 electrically connected to a system bus 1550.

The processor 1510 may control input/output of data of the memory 1520, the display device 1530, and the peripheral device 1540, and may perform image processing on image data transmitted between the corresponding devices.

The memory 1520 may include volatile memory such as dynamic random access memory (DRAM) and/or nonvolatile memory such as flash memory. The memory 1520 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (for example, a memory in which a static random access memory (SRAM) buffer, a NAND flash memory, and a NOR interface logic are combined). The memory 1520 may store image data acquired from the peripheral device 1540 or an image signal processed by the processor 1510.

The display device 1530 may include a TDDI 1531 and a panel 1532, and store image data applied through the system bus 1550 in a frame memory included in the TDDI 1531 and then display the image data in the panel 1532. The TDDI 1531 may be the semiconductor device according to the example embodiment. The TDDI 1531 may include an amplifier region that selectively operates as a source driver for transmitting a data signal to the panel 1532 to display image data or as a receiver for receiving a detection signal according to a touch input from the panel 1532.

The peripheral device 1540 may be a device, such as a camera, a scanner, or a webcam, that converts a moving image or still image to an electrical signal. The image data acquired through the peripheral device 1540 may be stored in the memory 1520 or displayed on the panel 1532 in real time.

The electronic system 1500 may be provided in a mobile electronic product such as a smart phone, but is not limited thereto, and may be provided in various types of electronic products that display images.

Figure 16:
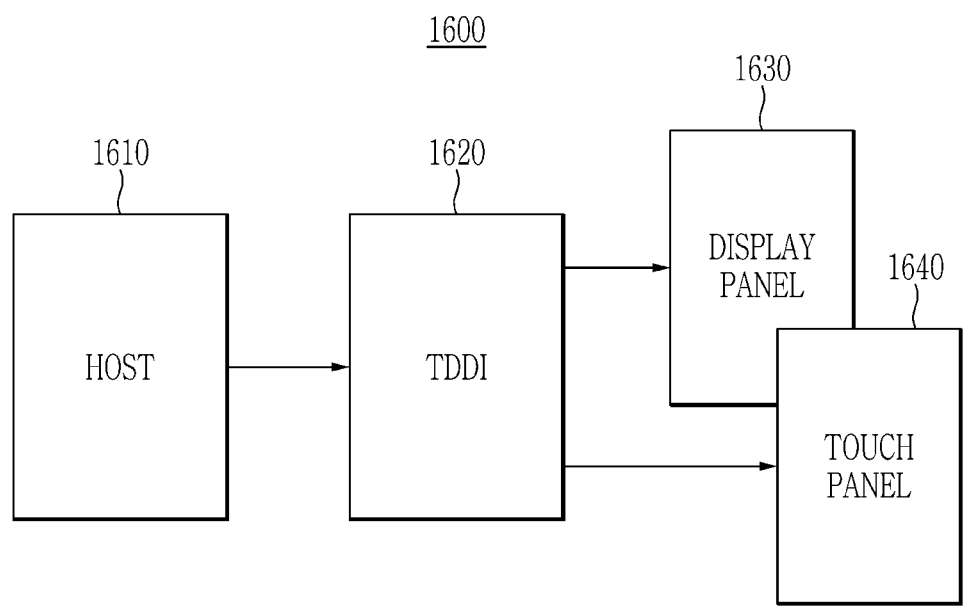
FIG. 16 is a diagram illustrating an electronic system according to an example embodiment.

FIG. 16 is a diagram illustrating an electronic system according to an example embodiment.

Referring to FIG. 16, an electronic system 1600 according to an example embodiment may include a host 1610, a TDDI 1620, a display panel 1630, and a touch panel 1640.

The host 1610 may receive data or a command from a user and control the TDDI 1620 based on the received data or command. The TDDI 1620 may drive the display panel 1630 and the touch panel 1640 under the control of the host 1610. The TDDI 1620 may include the semiconductor device according to the example embodiment. The TDDI 1620 may include an amplifier region that selectively operates as a source driver for transmitting transmits a data signal to the display panel 1630 to display image data or a receiver for receiving a detection signal according to a touch input from the touch panel 1640.

The touch panel 1640 may be provided to overlap the display panel 1630. The TDDI 1620 may receive the detected data from the touch panel 1640 and transmit the received data to the host 1610.

Figure 17:
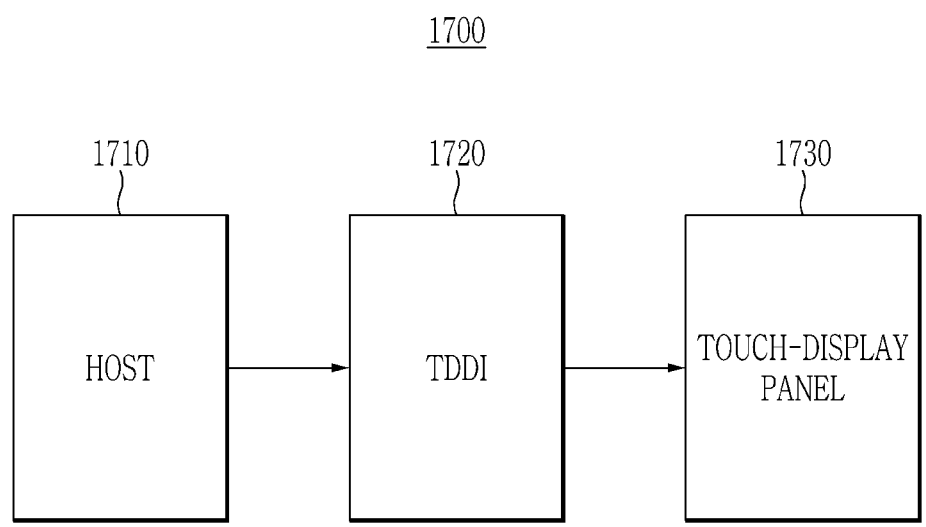
FIG. 17 is a diagram illustrating an electronic system according to an example embodiment.

FIG. 17 is a diagram illustrating an electronic system according to an example embodiment.

Referring to FIG. 17, an electronic system 1700 according to an example embodiment may include a host 1710, a TDDI 1720, and a touch-display panel 1730.

The host 1710 may receive data or a command from a user and control the TDDI 1720 based on the received data or command. The TDDI 1720 may drive the touch-display panel 1730 under the control of the host 1710. The TDDI 1720 may include the semiconductor device according to the example embodiment. The TDDI 1720 may include am amplifier region that selectively operates as a source driver for transmitting a data signal to the touch-display panel 1730 to display image data or as a receiver for receiving a detection signal according to a touch input from the touch-display panel 1730.

The TDDI 1720 may receive the detected data from the touch-display panel 1730 and transmit the received data to the host 1710.

Although an example embodiment of the disclosure has been described in detail, the scope of the disclosure is not limited by the example embodiment. Various changes and modifications using the basic concept of the disclosure defined in the accompanying claims by those skilled in the art shall be construed to belong to the scope of the invention.

In some example embodiments, each constituent component or combination of two or more constituent components described with reference to FIGS. 1 to 17 may be implemented with a digital circuit, a programmable or non-programmable logic device or array, an application specific integrated circuit (ASIC), and the like.

Although an example embodiment of the disclosure has been described in detail, the scope of the disclosure is not limited by the example embodiment. Various changes and modifications using the basic concept of the disclosure defined in the accompanying claims by those skilled in the art shall be construed to belong to the scope of the invention.

While this invention has been described in connection with what is presently considered to be practical example embodiments, it is to be understood that the invention is not limited to the disclosed example embodiments. On the contrary, it is intended to cover various modifications and equivalent arrangements included within the spirit and scope of the appended claims.

What is claimed is:

1. An electronic device, comprising:
    a transceiver comprising a first amplifier region configured to:
        output a first data signal based on first data, to a first source line connected to a pixel during a first period, and
        operate as an integrator to receive a detection signal from a touch electrode during a second period different from the first period; and
    a controller configured to:
        generate the first data based on second data, which is image data,
        output the first data to the transceiver, and
    generate a touch signal based on the detection signal,
    wherein the first source line and the touch electrode are selectively connected to the first amplifier region during the first period or the second period.

2. The electronic device of claim 1, wherein:
    the first amplifier region is further configured to:
        amplify an input signal at a first node, the input signal generated based on the first data, output the amplified input signal to the first source line as the first data signal through a second node during the first period, and output the detection signal input from the touch electrode to the second node through a third node during the second period.

3. The electronic device of claim 2, wherein:
the transceiver further comprises:
a digital-to-analog converter (DAC) configured to generate the input signal based on the first data; and
an analog-to-digital converter (ADC) configured to generate the touch signal based on the detection signal.

4. The electronic device of claim 3, wherein:
the first amplifier region comprises:
a first amplifier comprising a first input terminal connected to a fourth node and a first output terminal connected to the second node;
a first switch connected between the fourth node and a fifth node;
a capacitor comprising a first electrode connected to the second node and a second electrode connected to the fifth node;
a second amplifier comprising a second input terminal connected to the first node, a third input terminal connected to the third node, and a second output terminal connected to the fourth node;
a second switch connected between the fifth node and the third node;
a third switch connected between the second node and the third node;
a fourth switch connected between a sixth node and the third node;
a fifth switch connected between the sixth node and the second node;
a sixth switch connected between the first node and a common voltage supply terminal;
a seventh switch connected between the first node and the DAC; and
an eighth switch connected between the second node and the ADC.

5. The electronic device of claim 4, wherein:
the controller is further configured to control the transceiver during the first period to turn on the first switch, the third switch, the fifth switch, and the seventh switch and turn off the second switch, the fourth switch, the sixth switch, and the eighth switch during the first period.

6. The electronic device of claim 4, wherein:
the controller is further configured to control the transceiver during the second period to turn on the second switch, the fourth switch, the sixth switch, and the eighth switch, and turn off the first switch, the third switch, the fifth switch, and the seventh switch.

7. The electronic device of claim 2, wherein:
the transceiver further comprises a multiplexer configured to electrically connect the first source line and the second node or electrically connect the touch electrode and the third node based on a voltage level of an input selection signal.

8. The electronic device of claim 7, wherein:
the multiplexer is further configured to electrically connect the first source line and the second node during the first period, and electrically connect the touch electrode and the third node during the second period.

9. The electronic device of claim 1, wherein:
the transceiver further comprises a second amplifier region configured to:
output a second data signal to a second source line connected to a second pixel during the first period, and
receive the detection signal from the touch electrode during the second period.

10. The electronic device of claim 9, wherein:
the transceiver further comprises:
a first multiplexer configured to electrically connect the first source line and the first amplifier region or electrically connect the touch electrode and the first amplifier region based on a voltage level of an input selection signal; and
a second multiplexer configured to electrically connect the second source line and the second amplifier region or electrically connect the touch electrode and the second amplifier region based on the voltage level of the input selection signal.

11. An electronic device comprising:
a panel comprising:
a pixel connected to a gate line and a source line,
a first touch electrode extending in a first direction, and a second touch electrode extending in a second direction intersecting the first direction; and
a driving circuit comprising an amplifier region configured to:
transmit a data signal to the panel during a first period, and
operate as an integrator to receive a detection signal from the panel during a second period different from the first period,
wherein the source line and the first touch electrode are selectively connected to the amplifier region during the first period or the second period.

12. The electronic device of claim 11, wherein:
the panel comprises:
a first panel on which the gate line, the source line, and the pixel are provided, and
a second panel positioned on the first panel and on which the first touch electrode and the second touch electrode are provided.

13. The electronic device of claim 12, wherein:
the driving circuit further comprises a multiplexer configured to electrically connect the source line and the amplifier region or electrically connect the first touch electrode and the amplifier region based on a voltage level of an input selection signal.

14. The electronic device of claim 11, wherein:
the panel further comprises a shift register configured to output a gate signal to the gate line and a driving signal to the second touch electrode.

15. The electronic device of claim 11, wherein:
the gate line, the source line, the pixel, and the second touch electrode are provided on the panel, and
the second touch electrode comprises the gate line.

16. The electronic device of claim 15, wherein:
the panel further comprises a multiplexer configured to electrically connect the source line and the amplifier region or electrically connect the first touch electrode and the amplifier region based on a voltage level of an input selection signal.

17. The electronic device of claim 11, wherein:
the gate line, the source line, and the pixel are provided on the panel, the first touch electrode comprises the source line, and
the second touch electrode comprises the gate line.

18. The electronic device of claim 11, wherein:
the pixel is configured to display an image in units of one frame, and
the second period is a time period within a vertical blank period of one frame.

19. The electronic device of claim 11, wherein:
the pixel is configured to display an image in units of one frame, and
the one frame comprises a plurality of horizontal periods, and
each of the plurality of horizontal periods comprises the first period and the second period.

20. An electronic system comprising:
a host configured to provide an image signal;
a touch-display panel comprising a plurality of pixels, connected to a plurality of source lines, and a plurality of first touch electrodes, and
a driving circuit configured to:
receive the image signal from the host,
generate a plurality of data signals corresponding to the plurality of pixels based on the image signal,
receive a detection signal from the plurality of first touch electrodes to generate a touch signal, and
provide the touch signal to the host,
wherein the driving circuit comprises a plurality of amplifier regions configured to:
provide the plurality of data signals to the plurality of pixels during a first period, and
operate as an integrator to receive detection signals from the plurality of first touch electrodes during a second period different from the first period to generate an output signal,
wherein each of the plurality of source lines and each of the plurality of the first touch electrodes are selectively connected to each of the plurality of amplifier regions during the first period or the second period.

21. The electronic device of claim 1, wherein the first amplifier region comprises:
a first amplifier configured to output the first data signal to the first source line connected to the pixel during the first period; and
a second amplifier configured to operate as the integrator to receive the detection signal from the touch electrode during the second period.

22. The electronic device of claim 21, wherein the first amplifier is further configured to:
receive an input signal from a digital to analog converter (DAC),
amplify the input signal, and
output the amplified input signal as the first data signal.

23. The electronic device of claim 21, wherein the second amplifier is further configured to:
receive the detection signal from the touch electrode,
charge the detection signal by a capacitor,
amplify the charged detection signal, and
output the amplified signal to an analog to digital converter.

* * * * *